(12) United States Patent
Diankov et al.

(10) Patent No.: US 11,772,267 B2
(45) Date of Patent: *Oct. 3, 2023

(54) ROBOTIC SYSTEM CONTROL METHOD AND CONTROLLER

(71) Applicant: MUJIN, Inc., Tokyo (JP)

(72) Inventors: Rosen Nikolaev Diankov, Tokyo (JP); Yoshiki Kanemoto, Tokyo (JP); Denys Kanunikov, Tokyo (JP)

(73) Assignee: MUJIN, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,432

(22) Filed: Jun. 10, 2022

(65) Prior Publication Data

US 2022/0305656 A1 Sep. 29, 2022

Related U.S. Application Data

(63) Continuation of application No. 17/110,205, filed on Dec. 2, 2020, now Pat. No. 11,413,753, which is a
(Continued)

(30) Foreign Application Priority Data

Jun. 26, 2019 (JP) .................................. 2019-118678
Nov. 26, 2019 (JP) .................................. 2019-213029

(51) Int. Cl.
 *B25J 9/00* (2006.01)
 *B25J 9/16* (2006.01)
 (Continued)

(52) U.S. Cl.
 CPC ........... *B25J 9/1664* (2013.01); *B25J 9/1661* (2013.01); *B25J 9/1697* (2013.01); *G01S 17/89* (2013.01); *G06T 7/73* (2017.01)

(58) Field of Classification Search
 CPC ...... B25J 9/1664; B25J 9/1661; B25J 9/1697; G01S 17/89; G06T 7/73; Y02P 90/02;
 (Continued)

(56) References Cited

U.S. PATENT DOCUMENTS 4,831,549 A 5/1989 Red et al.
5,789,890 A 8/1998 Genov et al.
(Continued)

FOREIGN PATENT DOCUMENTS

CN 1747816 A 3/2006
CN 205466149 U 8/2016
(Continued)

OTHER PUBLICATIONS

Supplemental Notice of Allowability dated Jan. 28, 2020 for U.S. Appl. No. 16/546,226, filed Aug. 20, 2019, Inventor: Rosen Nikolaev Diankov, 2 pages.
(Continued)

*Primary Examiner* — Ian Jen
(74) *Attorney, Agent, or Firm* — Perkins Coie LLP

(57) ABSTRACT

The present disclosure provides a control method of a robotic system. The control method includes: deriving an approach location at which the end effector grips an operation object; deriving a scan location for scanning an identifier of the operation object; and based on the approach location and the scan location, creating or deriving a control sequence to instruct the robot to execute the control sequence. The control sequence includes (1) gripping the operation object from a start location; (2) scanning an identifier of the operation object with a scanner located between the start location and a task location; (3) temporarily releasing the operation object from the end effector and regripping the operation object by the end effector to be shifted, at a shift location, when a predetermined condition
(Continued)

is satisfied; and (4) moving the operation object to the task location.

20 Claims, 9 Drawing Sheets

Related U.S. Application Data continuation of application No. 16/752,582, filed on Jan. 24, 2020, now Pat. No. 10,870,204, which is a continuation-in-part of application No. 16/743,313, filed on Jan. 15, 2020, now Pat. No. 10,933,527, which is a continuation of application No. 16/546,209, filed on Aug. 20, 2019, now Pat. No. 10,569,416, which is a continuation of application No. 16/258,120, filed on Jan. 25, 2019, now Pat. No. 10,456,915.

(51) Int. Cl.
*G01S 17/89* (2020.01)
*G06T 7/73* (2017.01)

(58) Field of Classification Search
CPC ........ G05B 19/418; G05B 2219/39106; G05B 2219/39107; G05B 2219/40053
See application file for complete search history.

(56) References Cited

U.S. PATENT DOCUMENTS

| | | | |
|---|---|---|---|
| 10,335,963 B2 | 7/2019 | Nakazato et al. | |
| 10,350,755 B2 | 7/2019 | Wagner et al. | |
| 10,456,915 B1* | 10/2019 | Diankov | G06T 7/73 |
| 10,569,416 B1* | 2/2020 | Diankov | B25J 9/1612 |
| 10,569,417 B1 | 2/2020 | Diankov | |
| 10,576,631 B1 | 3/2020 | Diankov | |
| 10,596,701 B1 | 3/2020 | Diankov | |
| 11,413,753 B2 | 8/2022 | Diankov et al. | |
| 11,638,993 B2 | 5/2023 | Diankov | |
| 2004/0093119 A1 | 5/2004 | Gunnarsson et al. | |
| 2004/0167667 A1 | 8/2004 | Goncalves et al. | |
| 2005/0182518 A1 | 8/2005 | Karlsson | |
| 2006/0181236 A1 | 8/2006 | Brogardh | |
| 2011/0153076 A1 | 6/2011 | Noro | |
| 2011/0235054 A1 | 9/2011 | Koike et al. | |
| 2012/0143372 A1 | 6/2012 | Roh | |
| 2013/0110280 A1 | 5/2013 | Folk | |
| 2013/0343640 A1 | 12/2013 | Buehler | |
| 2014/0347473 A1 | 11/2014 | Wolff et al. | |
| 2015/0352717 A1 | 12/2015 | Mundt et al. | |
| 2016/0297068 A1 | 10/2016 | Thibodeau et al. | |
| 2016/0379370 A1 | 12/2016 | Nakazato et al. | |
| 2017/0165836 A1 | 6/2017 | Kanazawa | |
| 2017/0326739 A1* | 11/2017 | Nakazato | B25J 13/081 |
| 2017/0364076 A1* | 12/2017 | Keshmiri | G05B 19/0426 |
| 2020/0238517 A1 | 7/2020 | Diankov | |
| 2020/0238519 A1 | 7/2020 | Diankov et al. | |
| 2021/0154839 A1 | 5/2021 | Diankov et al. | |

FOREIGN PATENT DOCUMENTS

| | | |
|---|---|---|
| CN | 107263485 A | 10/2017 |
| DE | 10249786 A1 | 5/2004 |
| DE | 102014107143 A1 | 12/2014 |
| DE | 102017005882 A1 | 12/2018 |
| DE | 102017123877 A1 | 9/2019 |
| JP | H05217014 A | 8/1993 |
| JP | 05285803 A | 11/1993 |
| JP | 2013078825 A | 5/2013 |
| JP | 2013086914 A | 5/2013 |
| JP | 2013198943 A | 10/2013 |
| JP | 2017058130 A | 3/2017 |
| JP | 2017185578 A | 10/2017 |
| JP | 2018167950 A | 11/2018 |
| JP | 2018202550 A | 12/2018 |

OTHER PUBLICATIONS

Non-Final Office Action dated Apr. 4, 2019 for U.S. Appl. No. 16/258,120, filed Jan. 25, 2019, Inventor: Rosen Nikolaev Diankov, 18 pages.
U.S. Patent Office Issue Notification dated Mar. 4, 2020 for U.S. Appl. No. 16/546,226, filed Aug. 20, 2019, Inventor: Rosen Nikolaev Diankov.
Notice of Allowance dated Nov. 7, 2019 for U.S. Appl. No. 16/546,226, filed Aug. 20, 2019, Inventor: Rosen Nikolaev Diankov, 16 pages.
Interview Summary dated Apr. 25, 2019 for U.S. Appl. No. 16/258,120, filed Jan. 25, 2019, Inventor: Rosen Nikolaev Diankov, 3 pages.
U.S. Patent Office Examiner-Initiated Interview Summary dated Sep. 23, 2019 for U.S. Appl. No. 16/546,248, filed Aug. 20, 2019, 2 pages.
Interview Summary dated Aug. 21, 2019 for U.S. Appl. No. 16/258,120, filed Jan. 25, 2019, Inventor: Rosen Nikolaev Diankov, 3 pages.
Notice of Allowance dated Jul. 29, 2019 for U.S. Appl. No. 16/258,120, filed Jan. 25, 2019, Inventor: Rosen Nikolaev Diankov, 6 pages.
U.S. Patent Office Issue Notification dated Oct. 9, 2019 for U.S. Appl. No. 16/258,120, filed Jan. 25, 2019, Inventor: Rosen Nikolaev Diankov.
Notice of Allowance dated Nov. 6, 2019 for U.S. Appl. No. 16/546,209, filed Aug. 20, 2019, Inventor: Rosen Nikolaev Diankov, 21 pages.
U.S. Patent Office Issue Notification dated Feb. 5, 2020 for U.S. Appl. No. 16/546,209, filed Aug. 20, 2019, Inventor: Rosen Nikolaev Diankov.
Notice of Allowance dated Oct. 17, 2019 for U.S. Appl. No. 16/546,236, filed Aug. 20, 2019, Inventor: Rosen Nikolaev Diankov, 17 pages.
U.S. Patent Office Issue Notification dated Feb. 5, 2020 for U.S. Appl. No. 16/546,236, filed Aug. 20, 2019, Inventor: Rosen Nikolaev Diankov.
Notice of Allowance dated Oct. 25, 2019 for U.S. Appl. No. 16/546,248, filed Aug. 20, 2019, Inventor: Rosen Nikolaev Diankov, 16 pages.
U.S. Patent Office Issue Notification dated Feb. 12, 2020 for U.S. Appl. No. 16/546,248, filed Aug. 20, 2019, Inventor: Rosen Nikolaev Diankov.
Non-Final Office Action dated Aug. 6, 2020 for U.S. Appl. No. 16/743,313, filed Jan. 15, 2020, Inventor: Rosen Nikolaev Diankov, 17 pages.
Office Action for German patent application No. 102019130046.0, dated May 27, 2020, translation and original, 11 pages.
Office Action received for Chinese patent application No. 201910337803.9, dated Dec. 26, 2019, 5 pages.
Office Action for Japanese patent application No. 2019-080213, dated Jan. 17, 2020, translation and original, 6 pages.
Decision to Grant for Japanese patent application No. 2019-080213, dated Mar. 12, 2020, 3 pages.
German Patent and Trademark Office, Decision to Grant received for German patent application No. 102019130046.0, dated Oct. 6, 2020, translation and original, 6 pages.
Notice of Allowance dated Oct. 23, 2020 for U.S. Appl. No. 16/743,313, filed Jan. 15, 2020, Inventor: Rosen Nikolaev Diankov, 11 pages.
Notice to Grant for Chinese patent application No. 201910337803.9, dated Jun. 4, 2020, 4 pages.
Notice of Allowance dated Aug. 19, 2020 for U.S. Appl. No. 16/752,582, filed Jan. 24, 2020, First Inventor: Rosen Nikolaev Diankov, 26 pages.
Notice of Allowance dated Mar. 31, 2022 for U.S. Appl. No. 17/110,205, filed Dec. 2, 2020, First Inventor: Rosen Nikolaev Diankov, 11 pages.
Notice of Allowance dated Apr. 15, 2022 for U.S. Appl. No. 17/110,205, filed Dec. 2, 2020, First Inventor: Rosen Nikolaev Diankov, 8 pages.

(56) References Cited

OTHER PUBLICATIONS

Non-Final Office Action dated Aug. 23, 2022 for U.S. Appl. No. 17/157,975, filed Jan. 25, 2021, Inventor: Rosen Diankov, 23 pages.
Notice of Allowance dated Dec. 20, 2022 for U.S. Appl. No. 17/157,975, filed Jan. 25, 2021, Inventor: Rosen Diankov, 10 pages.
Office Action issued for German patent application No. DE 102019009198.1, dated Apr. 1, 2022, 10 pages.
Notice of Allowance issued for U.S. Appl. No. 17/110,205, dated Mar. 31, 2022, 22 pages.
CNIPA Notice to Grant dated Jul. 12, 2021 for Chinese patent application No. 202010834548.1.
CNIPA Office Action dated May 20, 2021 for Chinese patent application No. 202010834548.1, Applicant: Mujin, Inc., 7 pages.
Japanese Patent Office, Office Action dated Feb. 15, 2023 for patent application No. 2020-068723, Applicant: Mujin, Inc., 3 pages.
Japanese Patent Office, Notice to Grant dated Mar. 13, 2023 for patent application No. 2020-068723, Applicant: Mujin, Inc., 3 pages.

* cited by examiner

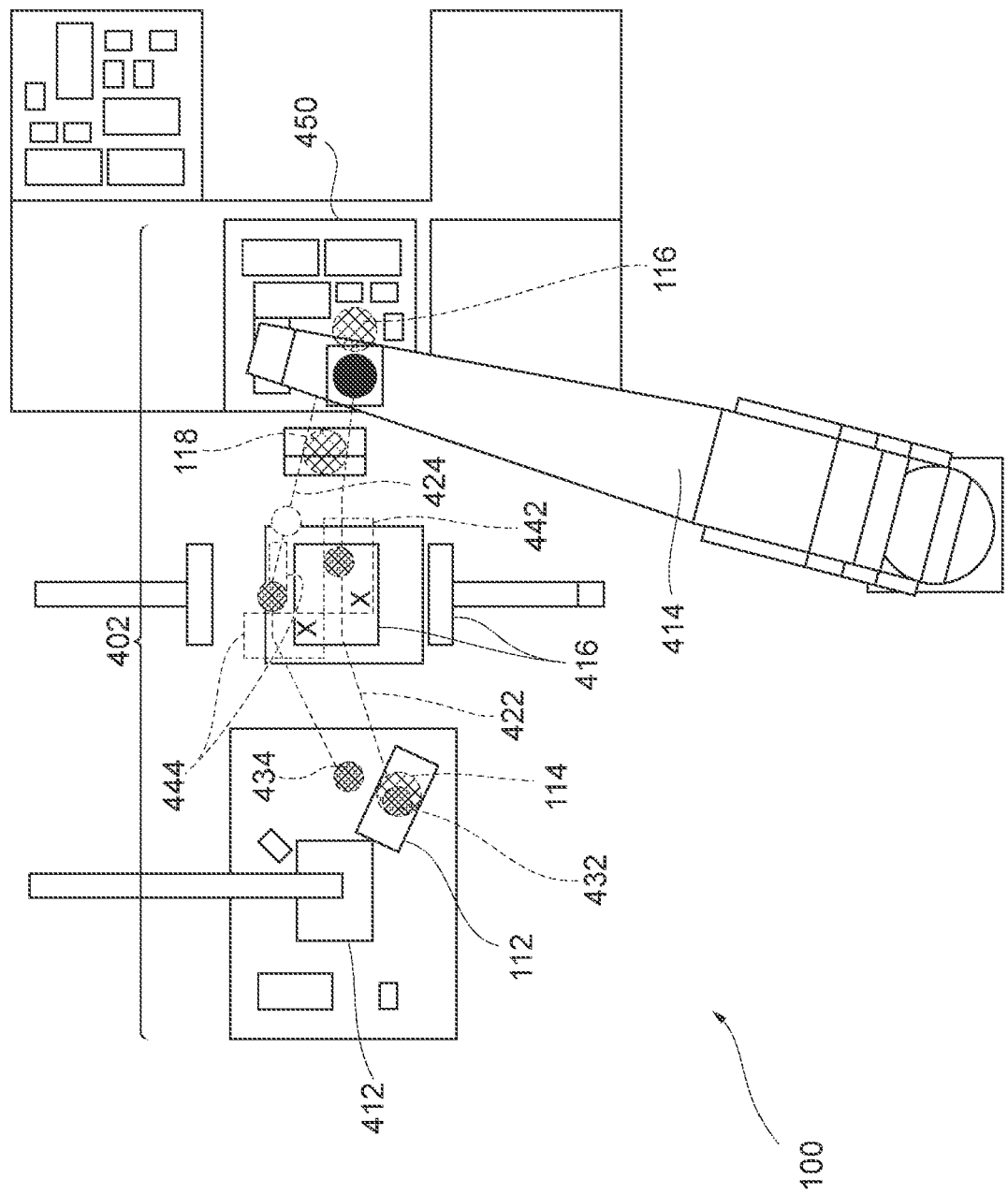

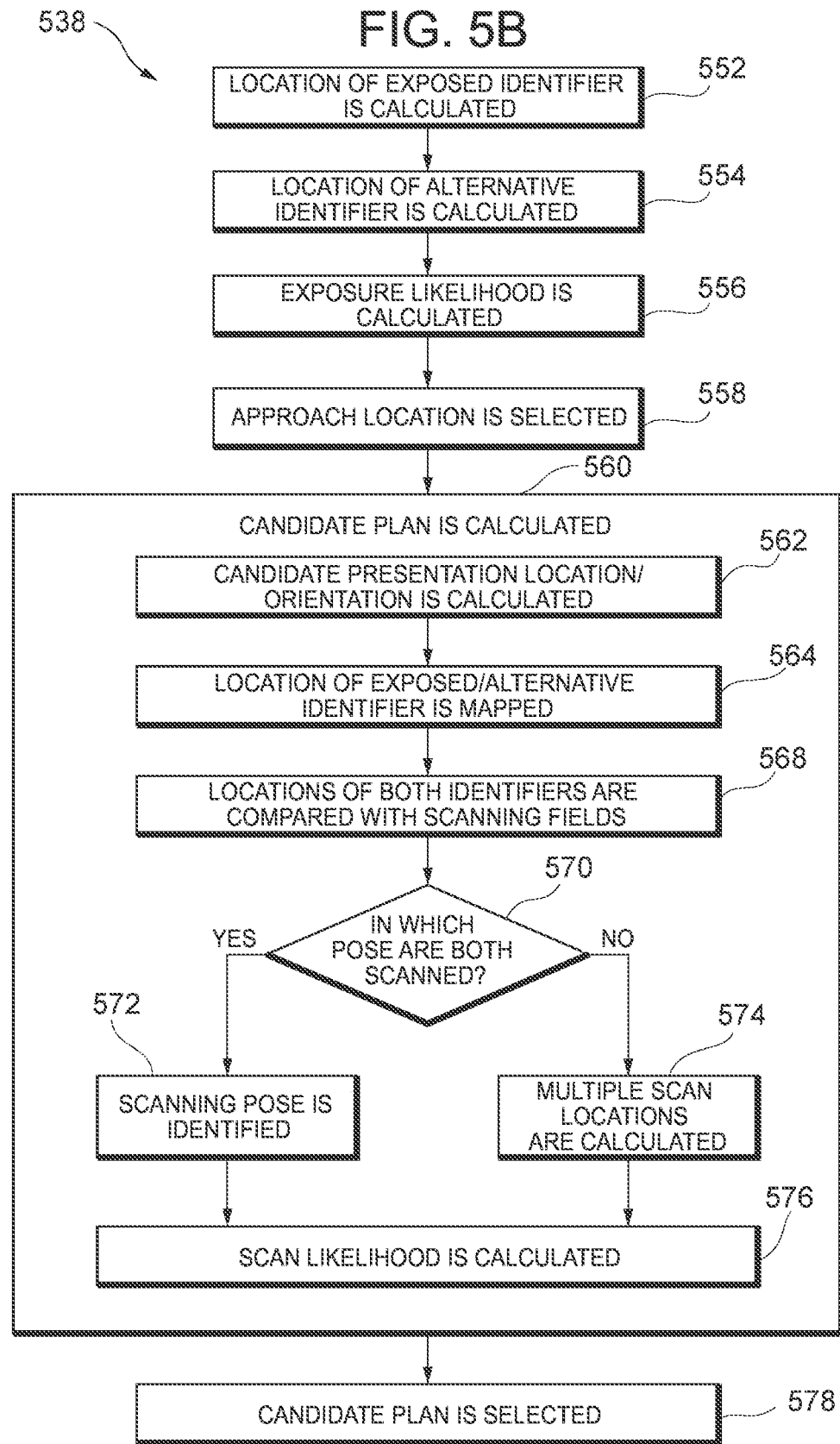

ROBOTIC SYSTEM CONTROL METHOD AND CONTROLLER

CROSS-REFERENCE TO RELATED APPLICATIONS

This application is a continuation of U.S. patent application Ser. No. 17/110,205 filed Dec. 2, 2020, now allowed, which is a continuation of U.S. patent application Ser. No. 16/752,582 filed Jan. 24, 2020 (now U.S. Pat. No. 10,870,204), which is a continuation-in-part of, and claims the benefit of U.S. patent application Ser. No. 16/743,313 filed Jan. 15, 2020 (now U.S. Pat. No. 10,933,527), which is a continuation of, and claims the benefit of U.S. patent application Ser. No. 16/546,209, filed Aug. 20, 2019 (now U.S. Pat. No. 10,569,416), which is a continuation of, and claims the benefit of U.S. patent application Ser. No. 16/258,120, filed Jan. 25, 2019 (now U.S. Pat. No. 10,456,915), which are incorporated by reference herein in their entireties.

This application contains subject matter related to U.S. patent application Ser. No. 16/546,226, filed Aug. 20, 2019 (now U.S. Pat. No. 10,596,701), U.S. patent application Ser. No. 16/546,236, filed Aug. 20, 2019 (now U.S. Pat. No. 10,569,417), and U.S. patent application Ser. No. 16/546,248, filed Aug. 20, 2019 (now U.S. Pat. No. 10,576,631), all titled "A ROBOTIC SYSTEM WITH ENHANCED SCANNING MECHANISM," and incorporated herein by reference in their entireties.

BACKGROUND OF THE INVENTION

Field of the Invention

The present disclosure relates generally to a robotic system, and more particularly to a controller and a control method of a robotic system that manipulates an operation object such as an article, a distribution system, a program, and a medium.

Description of Related Art

With their ever-increasing performance and lowering cost, many robots (e.g., machines configured to automatically/autonomously execute physical actions) are now extensively used in many fields. Robots, for example, can be used to execute various tasks such as manipulating or moving of an operation object in manufacturing, assembly, packing, transfer, transport, and the like. In executing the tasks, the robots can replicate human actions, thereby replacing or reducing dangerous or repetitive human tasks.

As a system (robotic system) using such a robot, for example, Japanese Patent Application Laid-Open No. 2018-167950 discloses an automatic distribution system. In order to automate and save labor from warehousing to delivering of an article, the automatic distribution system includes a carrying container storage mechanism that temporarily stores a carrying container; and an automatic article delivery mechanism in which articles in the carrying container are automatically collected in a shipment container based on delivery information.

However, despite technological advancement, robots often lack the sophistication required for replicating human involvement task in order to execute larger and/or more complex tasks. For this reason, automation and advanced functionality in robotic systems are not yet sufficient, and there are many tasks that are difficult to replace human involvement, and robotic systems lack the granularity of control and flexibility in actions to be executed. Therefore, there is still need for technical improvements to manage various actions and/or interactions between robots and further promote automation and advanced functionality of robotic systems. Therefore, an object of the present disclosure is to provide a controller and a control method of a robotic system, and the like that can realize a high degree of cooperation between units including a robot and can sufficiently increase a storage efficiency of an operation object, for example.

SUMMARY OF THE INVENTION

The present invention employs the following configuration to solve the above-described problems.

[1] According to the present disclosure, a control method of a robotic system that includes a robot having a robotic arm and an end effector comprises: deriving an approach location at which the end effector grips an operation object; deriving a scan location for scanning an identifier of the operation object; and based on the approach location and the scan location, creating or deriving a control sequence to instruct the robot to execute the control sequence. The control sequence includes the following (1) to (4):

(1) gripping the operation object at a start location;
(2) scanning identification information of the operation object (e.g., a computer-readable identifier such as a barcode or a Quick Response (QR) code (registered trademark)) with a scanner located between the start location and a task location;
(3) temporarily releasing the operation object from the end effector and regripping the operation object by the end effector to be shifted, at a shift location, when a predetermined condition is satisfied; and
(4) moving the operation object to the task location.

Here, the "operation object" indicates an object to be manipulated by the robot provided in the robotic system, and includes, for example, one or more articles (items), a bin, a container, and/or a box in which the articles are placed or stored. The containers may be packed or unpacked, and a part of the containers (e.g., an upper surface thereof) may be opened. In addition, in some embodiments and examples, the "operation object" may be placed on a shelf, a pallet, a conveyor, and other temporary placing places. The "control sequence" indicates an ordered set controls (e.g., commands and/or settings) for causing each corresponding robotic unit in the robotic system to execute an individual task.

[2] In the above described configuration, the control sequence may further include the following (5) and (6):

(5) setting a condition that a storage efficiency of the operation object at the task location is increased in a case where the operation object is shifted and a direction of gripping the operation object by the end effector is changed, as the predetermined condition; and
(6) calculating a storage efficiency at the task location before shifting the operation object and a storage efficiency at the task location after shifting the operation object.

[3] In the above described configuration, the control sequence may further include the following (7) and (8):

(7) deriving a height of the operation object; and
(8) calculating the storage efficiency based on the height of the operation object.

[4] In the above described configuration, the height of the operation object may be calculated from a height location (level) of a top surface of the operation object and a height location (level) of a bottom surface of the operation object measured in a state of being gripped by the end effector.

[5] In the above described configuration, the height of the operation object may be measured when the operation object is scanned with the scanner.

[6] In the above described configuration, the control sequence may further include (9) temporarily releasing the operation object from the end effector by placing the operation object on a temporary placing table, at the shift location, when the predetermined condition is satisfied.

[7] In the above described configuration, the control method may further include: deriving imaging data indicating a pick-up area including the operation object; determining an initial pose of the operation object based on the imaging data; calculating a confidence measure indicating a likelihood that the initial pose of the operation object is accurate; and deriving the approach location and the scan location based on the confidence measure.

Here, the "pose" indicates a location and/or an orientation of the operation object (e.g., a posture including an orientation in a stopped state), and includes a translational component and/or a rotational component in a grid system utilized by the robotic system. In addition, the "pose" can be represented by a vector, a set of angles (e.g., Euler angles and/or roll-pitch-yaw angles), a homogeneous transformation, or a combination thereof. In the "pose" of the operation object, a coordinate transformation thereof and the like may include a translational component, a rotational component, changes thereof, or a combination thereof.

In addition, the "confidence measure" indicates a quantified measure representing a degree of certainty (a degree of a certainty or a likelihood) that a determined pose of the operation object matches an actual pose of the operation object in a real-world. In other words, the "confidence measure" may be a measure indicating an accuracy of a determined pose of the operation object. The "confidence measure" may be referred to as an index indicating a likelihood that a determined pose matches an actual pose of the operation object. For example, the "confidence measure" can be a measure to be derived based on a result of matching between one or more visible characteristics of the operation object (e.g., a shape, a color, an image, a design, a logo, a text, and the like) in image data of a pick-up area including the operation object and information regarding the visible characteristics of the operation object stored in master data.

[8] In the above described configuration, the control sequence may further include (10) selectively calculating the approach location and the scan location according to a performance metric and/or a scan metric, based on a result of comparing the confidence measure to a sufficiency threshold, and the scan metric may be related to a likelihood that the identifier of the operation object is not covered by the end effector, regardless of whether the initial pose of the operation object is accurate or not.

[9] In the above described configuration, when the confidence measure does not satisfy the sufficiency threshold, the approach location and the scan location may be derived based on the scan metric or may be derived based on the scan metric with prioritizing the scan metric over the performance metric.

[10] Possibly, in the above described configuration, when the confidence measure satisfies the sufficiency threshold, the approach location and the scan location may be derived based on the performance metric.

[11] In the above described configuration, the control sequence may further include the following (11) and (12):

(11) deriving a first scan location for providing identification information of the operation object to the scanner, and a second scan location for providing alternative identification information of the operation object to the scanner; and

(12) moving the operation object to the task location and ignoring the second scan location in a case where a scan result indicates a successful scan, or moving the operation object to the second scan location in a case where the scan result indicates a failed scan, after the operation object is moved to the first scan location.

[12] In addition, according to the present disclosure, there is provided a non-transitory computer-readable medium storing processor instructions for performing a control method of a robotic system that includes a robot having a robotic arm and an end effector, in which the processor instructions include an instruction for deriving an approach location at which the end effector grips an operation object; an instruction for deriving a scan location for scanning an identifier of the operation object; and an instruction for creating or deriving a control sequence to instruct the robot to execute the control sequence, based on the approach location and the scan location. The control sequence includes the following (1) to (4):

(1) gripping the operation object at a start location;

(2) scanning identification information of the operation object with a scanner located between the start location and a task location;

(3) temporarily releasing the operation object from the end effector and regripping the operation object by the end effector to be shifted, at a shift location, when a predetermined condition is satisfied; and (4) moving the operation object to the task location.

[13] In the above described configuration, the control sequence may further include the following (5) and (6):

(5) setting a condition that a storage efficiency of the operation object at the task location is increased in a case where the operation object is shifted and a direction of gripping the operation object by the end effector is changed, as the predetermined condition; and (6) calculating a storage efficiency at the task location before shifting the operation object and a storage efficiency at the task location after shifting the operation object.

[14] In the above described configuration, the control sequence may further include the following (7) and (8):

(7) deriving a height of the operation object; and (8) calculating the storage efficiency based on the height of the operation object.

[15] In the above described configuration, the height of the operation object may be calculated from a height location (level) of a top surface of the operation object and a height location (level) of a bottom surface of the operation object measured in a state of being gripped by the end effector.

[16] In addition, according to the present disclosure, there is provided a controller of a robotic system that includes a robot having a robotic arm and an end effector, the controller executing the control method according to any one of [1] to [11].

BRIEF DESCRIPTION OF THE DRAWINGS

FIG. 4A is a top view illustrating an example task executed by the robotic system in accordance with the embodiment of the present disclosure.

FIG. 5B is a flow diagram illustrating an example process flow of the robotic system in accordance with the embodiment of the present disclosure.

DETAILED DESCRIPTION OF THE PREFERRED EMBODIMENTS

Figure 1:
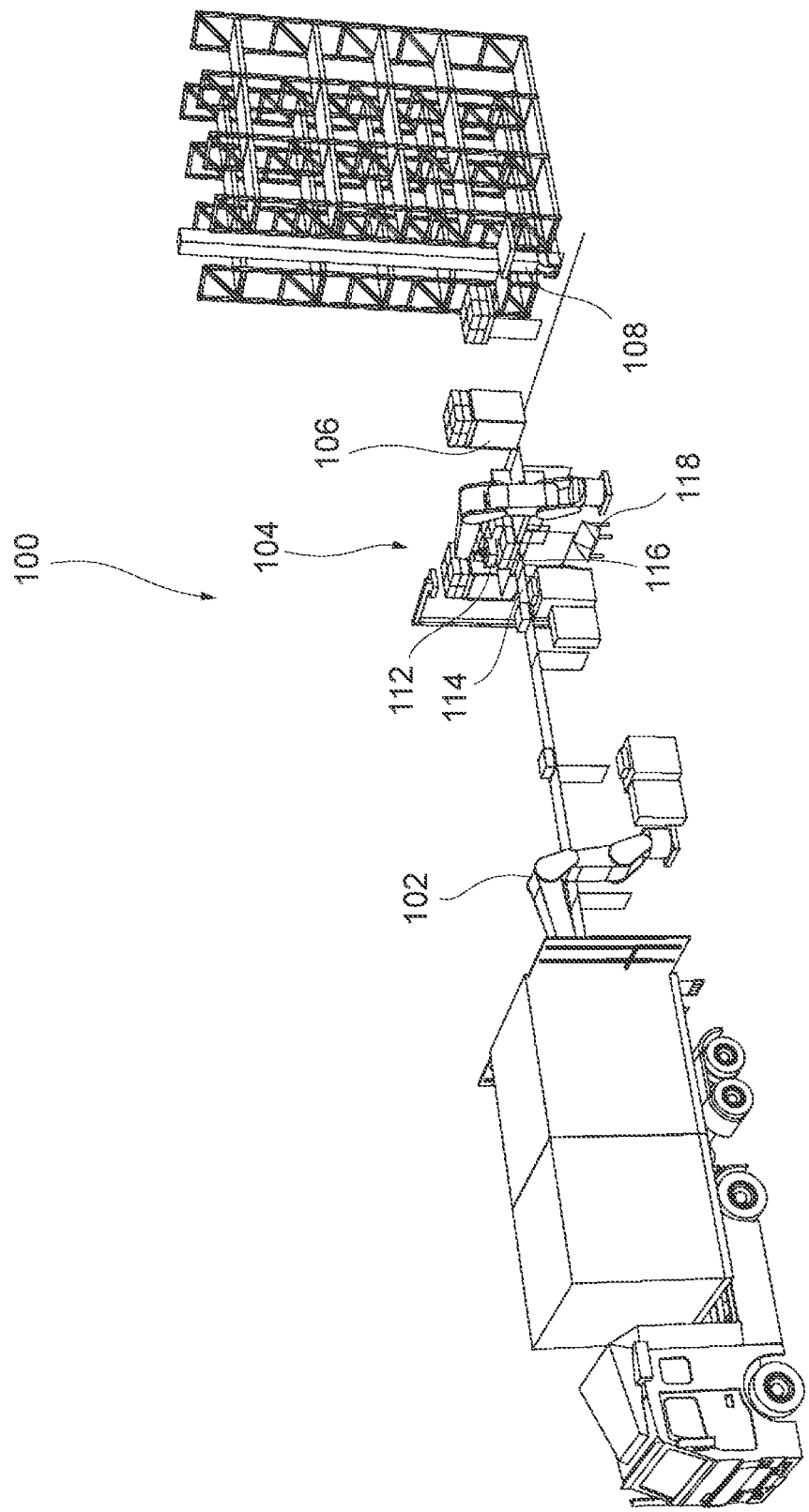
FIG. 1 is an illustration of an exemplary environment in which a robotic system in accordance with an embodiment of the present disclosure may operate.

According to the present disclosure, a robotic system in which multiple units (e.g., various robots, various devices, a controller provided integrally therewith or separately therefrom, and the like) are highly integrated, the controller thereof, a distribution system provided with these, a method therefor, and the like are provided. For example, a robotic system in accordance with an embodiment of the present disclosure is an integrated system that can autonomously execute one or more tasks. The robotic system in accordance with the embodiment of the present disclosure can perform advanced handling of objects that can and significantly increase an storage efficiency of a storage container, based on a shape or dimension of an operation object and a space volume of the storage container, when the operation object is stored in the storage container and the like. In addition, an advanced scan can be performed on the operation object by creating or deriving a control sequence based on a confidence measure related to an initial pose of the operation object and executing the control sequence.

The robotic system in accordance with the embodiment of the present disclosure can be configured to execute a task based on operating (e.g., physical movement and/or orientation) on the operation object. More specifically, for example, the robotic system can sort or transfer various operation objects by picking up the operation object from a pick-up area including a start location (e.g., a large box, a bin, a container, a pallet, a storage container, a bucket, a cage, a belt conveyor, and the like as a supply source of the operation object) and moving the operation object to a placement area including an objective task location (e.g., a large box, a bin, a container, a pallet, a storage container, a bucket, a cage, a belt conveyor, and the like as a transfer destination of the operation object).

A control sequence which is executed by the robotic system can include scanning one or more identifiers (e.g., a barcode, a Quick Response (QR) code (registered trademark), and the like) located on one or more specific locations and/or surfaces of the operation object, during transfer. Therefore, the robotic system can execute various tasks such as gripping and picking up the operation object, scanning the identifier at an appropriate location/orientation, adjusting the pose, changing the pose and shifting (releasing grip, and regripping and picking up the operation object), transferring the operation object to the task location and releasing grip, and disposing the operation object at the task location.

The robotic system can further include an imaging device (e.g., a camera, an infrared sensor/camera, a radar, a lidar, and the like) used to identify a location and a pose of the operation object and an environment around the operation object. Further, the robotic system can calculate a confidence measure associated with the pose of the operation object. In addition, the robotic system can derive an image indicating a location and an orientation of the operation object at a time of being transferred to a pick-up area including a start location, a placement area including a task location, an area including a shift location in the middle of a movement path of the operation object (e.g., a task table such as a temporary placement table, other robots, and the like), and the like.

The robotic system can further perform image processing in order to identify or select an operation object according to a predetermined order (e.g., from top to bottom, outside to inside, inside to outside, and the like). Furthermore, for example, the robotic system can determine the initial pose of the operation object in a pick-up area from the image by identifying outlines of the operation object and grouping the outlines based on a color, a brightness, and a depth/location of a pixel, and/or a combination thereof in a pattern image of imaging data, and changes in their values, for example. In determining the initial pose, the robotic system can calculate the confidence measure according to a predetermined process and/or equation.

The robotic system can further perform shifting of the operation object (changing of the grip location of the operation object) as necessary at a shift location provided in the middle of a route from the pick-up area including the start location and the like to the placement area including the task location and the like. Then, while the operation object is moved from the pick-up area including the start location and the like to the placement area including the task location and the like, the robotic system can derive a height of the operation object as necessary by an imaging device having a distance measuring function, for example.

The robotic system can further execute a control sequence for executing each task according to a location, a pose, a height, and a confidence measure of the operation object, or a combination thereof, and/or a location and a pose of the robot, or a combination thereof. Such a control sequence can be created or derived by machine learning such as motion planning and deep learning. The control sequence corresponds to gripping of the operation object, manipulating of the operation object, placing the operation object at an objective task location, and the like, at the start location and/or an any location during movement, in order to sort, shift, and replace the operation object, for example.

Here, traditional robotic systems execute a control sequence in which an operation object is gripped in a pick-up area including a start location and the like, and the operation object is moved to a placement area, including a task location and the like, in the originally gripped state. Therefore, in the traditional systems, the gripped operation object is merely moved in a gripped state and released from the gripped state, and thus it could not be said that a space in which the operation object is stacked or stored can be used in a sufficiently effective manner. For this reason, from a viewpoint of stacking or a storage efficiency of operation objects, human intervention (adjustment, re-execution, complementation, system stop, and the like) and an operation input therefor may be required.

Unlike the traditional systems, the robotic system according to the present disclosure can create or derive a control sequence based on shape information of the operation object and stacking or storage information of the operation object and execute the control sequence. In other words, the robotic system according to the present disclosure can further optimize a stacking or storage efficiency of the operation object based on shape information of the operation object and stacking or storage information of the operation object. In addition, the robotic system according to the present disclosure can change a grip location of the operation object to a grip location suitable for optimization of a stacking or storage efficiency of the operation object, at a shift location that is in the middle of a route between the task location and the start location.

In addition, unlike the traditional systems, the robotic system according to the present disclosure can create or derive a control sequence suitable for optimization of a stacking or storage efficiency of the operation object according to an actual height of the operation object, as necessary and execute the control sequence. For example, even though one or more identifiers located on one or more specific locations and/or a surface of the scanned operation object are the same, the operation object may have different shape dimensions. Therefore, on an upstream side (previous stage) of the shift location, in the control sequence, a height of the operation object is measured based on distance information from the imaging device (camera or distance measuring device) located and oriented in along a vertical direction to the operation object for which a supported location is known, for example. Then, based on the measured height of the operation object, a stacking or storage efficiency of the operation object at the task location can be calculated. Based on the result, the control sequence can be further optimized.

Further, unlike the traditional systems, the robotic system according to the present disclosure can create, derive, and implement a control sequence according to a confidence measure as necessary. For example, according to the confidence measure, approach to the operation object can be changed, the grip location on the operation object can be changed, the pose/location of the operation object can be changed, and/or a part of the movement path can be changed.

In the pose of the operation object gripped in the pick-up area and the like, generally, a top surface of the operation object can be exposed facing horizontally (upward) and a side surface of the operation object can be exposed facing vertically (laterally). Therefore, the robotic system according to the present disclosure can include master data where the operation object has one identifier on a bottom surface of the operation object (i.e., a side opposite to the top surface of the operation object), and has another identifier on one of the side surfaces of the operation object.

The robotic system according to the present disclosure can further calculate a confidence measure as necessary when processing an image of the pick-up area in identifying an operation object. In a case where the confidence measure exceeds a sufficiency threshold and there is sufficient certainty that the top surface of the operation object is exposed, the robotic system can dispose an end effector on the exposed top surface, grip the top surface, and rotate the operating object so as to present the bottom surface of the operation object at a predetermined location in front of the scanner. On the other hand, in a case where the confidence measure is less than a sufficiency threshold and it is uncertain whether the top surface or the bottom surface of the operation object is exposed, the robotic system can dispose the end effector along one of the side surfaces of the operation object, grip the side surface of the operation object, and rotate the operation object so as to pass between a set of opposed scanners, for example.

In this case, a task efficiency and a task speed are improved by scanning the operation object in the movement path of the operation object, for example, between the pick-up area including the start location and the placement area including the task location. At this time, the robotic system according to the present disclosure can effectively combine a movement task of the operation object and the scan task of the operation object by creating or deriving a control sequence that also coordinates with or operates the scanner when the operation object is at the scan location. Further, by creating or deriving a control sequence based on the confidence measure of the initial pose of the operation object, an efficiency, a speed, and an accuracy regarding the scan task can be further improved.

The robotic system according to the present disclosure can further create or derive a control sequence corresponding to a case where the initial pose of the operation object is not accurate. As a result, even when there is an error in determining the pose of the operation object (e.g., an error in determining the result of a calibration error, an unexpected pose, an unexpected light condition, and the like), a likelihood of accurately and reliably scanning the operation object can be increased. As a result, overall throughput for the robotic system can be increased and operator efforts/interventions can be further reduced.

Further, in this specification, numerous specific details are set forth to provide a thorough understanding of the present disclosure, but the present disclosure is not limited thereto. In addition, in the embodiment of the present disclosure, the techniques described herein can be implemented without these specific details. Further, well-known specific functions, routines, or the like are not described in detail in order to avoid unnecessarily obscuring the present disclosure. References in this specification to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Further, the particular features, structures, materials, or characteristics can be combined in any suitable manner in one or more embodiments. In addition, it is to be understood that the various embodiments shown in the figures are merely illustrative representations and are not necessarily drawn to scale.

In addition, for structures or processes that are well-known and often associated with robotic systems and sub-systems, but that can unnecessarily obscure some significant aspects of the present disclosure, the description is omitted for purposes of clarity of the present disclosure. Moreover, in this specification, although various embodiments of the present disclosure are set forth, the present disclosure includes configurations or components different from description in this section, as other embodiments. Accordingly, the present disclosure can include other embodiments with additional elements or without some of elements described below.

In addition, each embodiment of the present disclosure can take a form of computer- or controller-executable instructions, including routines executed by a programmable computer or controller. It should be noted that one of ordinary skill in the art to which the present disclosure belongs can understand that the techniques of the present disclosure can be implemented in systems including various computers or controllers. The techniques of the present disclosure can be implemented in a special purpose computer or data processor that is programmed, configured, or constructed to execute one or more instructions on various computers. Accordingly, the terms "computer" and "controller" used herein may be any data processor and can include Internet-based devices and handheld devices (including palm-top computers, wearable computers, cellular or mobile phones, multi-processor systems, processor-based or programmable consumer electronics, network computers, mini computers, and the like). Information handled by these computers and controllers can be provided at any suitable display medium such as a liquid crystal display (LCD). Instructions for executing computer- or controller-executable tasks can be stored in or on any suitable computer-readable medium, including hardware, firmware, or a combination of hardware and firmware. In addition, these instructions can be recorded in any suitable memory device including a flash drive and/or other suitable media, for example.

In addition, in this specification, the terms "coupled" and "connected," along with their derivatives, can be used to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in direct contact with each other or indirect contact with each other with other intervening elements therebetween, or that the two or more elements cooperate or interact with each other, for example, as in a cause-and-effect relationship, such as for signal transmission/reception or for function calls, or both.

Suitable Environments

FIG. 1 is a view illustrating an example environment in which a robotic system 100 in accordance with an embodiment of the present disclosure can operate. The robotic system 100 includes units such as one or more robots configured to execute one or more tasks.

For the example illustrated in FIG. 1, the robotic system 100 can include an unloading unit 102, a transfer unit 104, a transport unit 106, a loading unit 108, or a combination thereof in a warehouse or a distribution/transport hub. The various units can be examples of the robots that manipulates an operation object. The robotic units can include a robot for operating the operation object by a robotic arm and an end effector, such as a devanning robot, a piece picking robot, and a fetching robot. In addition, each unit in the robotic system 100 can execute a control sequence in which multiple actions are combined so as to perform one or more tasks, for example, the multiple actions such as unloading the operation object from a truck, a van, and the like for storage in a warehouse, unloading the operation object from a storage location, for example, moving the operation object between containers, or loading the operation object into a truck or a van for transport. In other words, the "task" can include various movements and actions intended to transfer the operation object from one location" to another location.

The task can include operating transferring an operation object 112 from a start location 114 of the operation object 112 to a task location 116 (e.g., movement, orientation, pose change, and the like), shifting the operation object 112 at a shift location 118 provided in the middle of the movement path of the operation object 112 from the start location 114 to the task location 116, scanning the operation object 112 for deriving identification information of the operation object 112, and the like.

For example, the unloading unit 102 can be configured to transfer the operation object 112 from a location in a carrier (e.g., a truck) to a location on a belt conveyor. Further, the transfer unit 104 can be configured to transfer the operation object 112 from a location (e.g., a pick-up area including a start location) to another location (e.g., a placement area including a task location on the transport unit 106), and to shift the operation object 112 in the middle of the movement path thereof. Further, the transport unit 106 can transfer the operation object 112 from an area associated with the transfer unit 104 to an area associated with the loading unit 108. Furthermore, the loading unit 108 can transfer the operation object 112 from the transfer unit 104 to a storage location (e.g., a predetermined location on a shelf such as a rack in a warehouse) by moving, for example, a pallet on which the operation object 112 is placed.

Further, in the description herein, the robotic system 100 is described as an example applied in a transport center; however, it is understood that the robotic system 100 can be configured to execute tasks in other environments/for other purposes, such as for manufacturing, assembly, packaging, healthcare, and/or other types of automation. It is also understood that the robotic system 100 can include other units, such as a manipulator, a service robot, and a modular robot, which are not shown in FIG. 1. For example, the robotic system 100 can include, an unloading unit from a pallet to transfer the operation object 112 from a cage cart or a pallet to a conveyor or other pallet, a container-switching unit for transferring the operation object 112 between containers, a packaging unit for wrapping the operation object 112, a sorting unit for performing grouping according to characteristics of the operation object 112, a picking unit for various operation (e.g., sorting, grouping and/or transferring) the operation object 112 according to the characteristics of the operation object 112, a self-propelled carriage unit (e.g., automated guided vehicle, unmanned guided vehicle, and the like) for moving a pallet or rack for storing the operation object 112, or any combination thereof.

Suitable System

Figure 2:
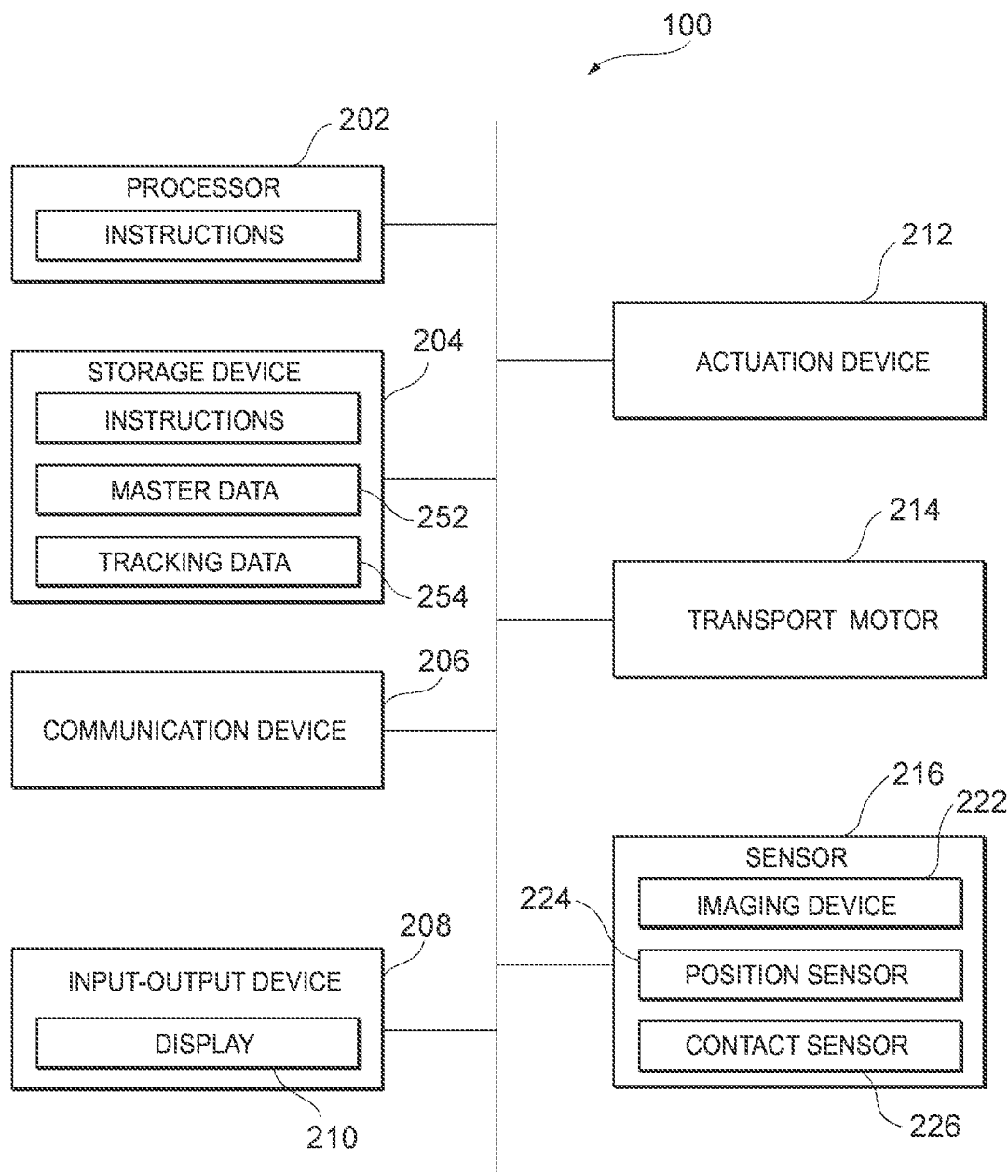
FIG. 2 is a block diagram illustrating an example of a hardware configuration of the robotic system in accordance with the embodiment of the present disclosure.

FIG. 2 is a block diagram illustrating an example of a hardware configuration of the robotic system 100 in accordance with the embodiment of the present disclosure. For example, the robotic system 100 can include an electronic or electrical device, such as one or more processors 202, one or more storage devices 204, one or more communication devices 206, one or more input-output devices 208, one or more actuation devices 212, one or more transport motors 214, one or more sensors 216, or a combination thereof. These various electronic or electrical devices can be coupled to each other via a wire connection and/or a wireless connection.

The robotic system 100 can include, for example, a bus, such as a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire"). Further, the robotic system 100 can include, for example, a bridge, an adapter, an amplifier, or other signal-related devices for providing the wire connection between the electronic or electrical devices. In addition, the wireless connection can be based on, for example, a cellular communication protocol (e.g., 3G, 4G, LTE, 5G, and the like), a wireless local area network (LAN) protocol (e.g., wireless fidelity (WIFI)), a peer-to-peer or device-to-device communication protocol (e.g., Bluetooth (registered trademark), Near-Field communication (NFC), and the like), an Internet of Things (IoT) protocol (e.g., NB-IoT, LTE-M, and the like), and/or other wireless communication protocols.

The processor 202 can include a data processor (e.g., a central processing unit (CPU), a special-purpose computer, and/or an onboard server) configured to execute instructions (e.g., software instructions) stored on the storage device 204 (e.g., a computer memory). The processor 202 can implement the program instructions to control/interact with other devices, thereby causing the robotic system 100 to execute a control sequence including various actions, tasks, and/or operations.

The storage device 204 can include a non-transitory computer-readable medium having stored thereon program instructions (e.g., software). Examples of the storage device 204 can include, for example, volatile memory (e.g., cache and/or random-access memory (RAM)) and/or non-volatile memory (e.g., a flash memory and/or a magnetic disk drive), a portable memory drive, and/or a cloud storage device, and the like. In addition, the storage device 204 can be used to further store and provide access to a processing result and/or predetermined data/threshold, and can store, for example, master data 252 that includes information related to the operation object 112.

The master data 252 includes information related to the operation object 112, such as a dimension, a shape outline, a mass or a weight, a location of the center of mass, a template related to a pose and an outline, model data for recognizing different poses, a stock keeping unit (SKU), a color scheme, an image, identification information, a logo, an expected location of the operation object, an expected measurement value by a sensor (e.g., physical quantity related to a force, a torque, a pressure, a contact measure value), a combination thereof, or the like.

The storage device 204 can further store, for example, tracking data 254 of the operation object 112. The tracking data 254 can include a log of an operation object to be scanned or manipulated, imaging data (e.g., a photograph, a point cloud, a live video, and the like) of the operation object 112 at one or more locations (e.g., an appropriate start location, a task location, a shift location, and the like), and a location and/or a pose of the operation object 112 at one or more locations thereof.

The communication device 206 can include, for example, a circuit, a receiver, a transmitter, a modulator/demodulator (modem), a signal detector, a signal encoder/decoder, a connector port, a network card, and the like, configured to communicate with an external or remote device via a network. In addition, the communication device 206 can be configured to send, receive, and/or process an electrical signal according to one or more communication protocols (e.g., the Internet Protocol (IP), a wireless communication protocol, and the like). The robotic system 100 can use the communication device 206 to exchange information between respective units or exchange information with an external system or an external device for the appropriate purposes of, for example, reporting, data gathering, analyzing, troubleshooting, and the like.

The input-output device 208 is a user interface device configured to input information and instructions from the operator and to communicate and present information to the operator, and can include, for example, an input device such as a keyboard, a mouse, a touchscreen, a microphone, a user interface (UI) sensor (e.g., a camera for receiving motion commands), and a wearable input device, and an output device such as a display 210, a speaker, a tactile circuit, and a tactile feedback device. In addition, the robotic system 100 can use the input-output device 208 to communicate with the operator in executing an action, a task, an operation, or a combination thereof.

The robotic system 100 can include, for example, a physical or structural member (e.g., a robotic manipulator, a robotic arm, and the like, and hereinafter, referred to as "structural member") connected by a link or a joint in order to execute a control sequence including displacement such as movement or rotation of the operation object 112. Such a physical or structural member, link, or joint, can be configured to manipulate an end effector (e.g., a gripper, a hand, and the like) configured to execute one or more tasks (e.g., gripping, rotation, welding, assembly, and the like) in the robotic system 100. In addition, the robotic system 100 can include the actuation device 212 (e.g., a motor, an actuator, a wire, an artificial muscle, an electroactive polymer, and the like) configured to drive or manipulate (e.g., displace and/or reorient) the structural member about a joint or at a joint, and the transport motor 214 configured to transfer the units from a location to another location.

The robotic system 100 can further include the sensor 216 configured to derive information used to implement the task, such as for manipulating the structural member and/or for transferring the unit. The sensor 216 can include a device configured to detect or measure one or more physical characteristics of the robotic system 100 (e.g., a state, a condition, a location, and the like of one or more structural members, links, or joints) and/or characteristics of a surrounding environment, for example, an accelerometer, a gyroscope, a force sensor, a strain gauge, a tactile sensor, a torque sensor, a location encoder, and the like.

Further, the sensor 216 can include one or more imaging devices 222 (e.g., a visual and/or infrared camera, a 2-dimensional and/or 3-dimensional imaging camera, a distance measuring device such as a lidar or a radar, and the like) configured to detect the surrounding environment. The imaging device 222 can generate a representation of the detected environment, such as a digital image and/or a point cloud, in order to obtain visual information for automatic inspection, robot guidance, or other robot applications, for example.

The robotic system 100 can further process the digital image, the point cloud, distance measurement data, and the like via, e.g., the processors 202 to identify the operation object 112 of FIG. 1, the start location 114 of FIG. 1, the task location 116 of FIG. 1, the shift location 118 between the start location 114 and the task location 116, a pose of the operation object 112, a confidence measure regarding the pose of the operation object at the start location 114 and the like, a confidence measure regarding a height of the operation object 112, or a combination thereof.

Further, in order to manipulate the operation object 112, the robotic system 100 can identify the operation object 112, the start location 114 thereof, the task location 116 thereof, the shift location 118, and the like by obtaining and analyzing an image of a designated area (e.g., a pick-up area such as in a truck or on a belt conveyor, a placement area for disposing the operation object 112 on the belt conveyor, area for shifting the operation object 112, an area for disposing the operation object in the container, an area on the pallet for stacking the operation object 112, and the like) through various units. In addition, the imaging device 222 can include, for example, one or more cameras configured to generate an image of a pick-up area, a placement area, an area for shifting the operation object 112 set therebetween, and the like.

The imaging device 222 can further include, for example, one or more distance measuring devices such as lidars or radars configured to measure a distance to the operation object 112 supported at a predetermined location, before or upstream from the shift location 118. Based on the processed image and/or distance measurement data, the robotic system 100 can determine a start location 114, a task location 116, a shift location 118, a related pose, an actual height of the operation object 112, a confidence measure, and the like.

In addition, for scanning the operation object 112, the imaging device 222 can include one or more scanners 412 and 416 (e.g., a barcode scanner, a QR code scanner (registered trademark), and the like: see FIGS. 4A and 4B described below) configured to scan identification information (e.g., an identifier 332 of FIG. 3A and/or FIG. 3C described below) of the operation object 112 during the transport or movement of the operation object, for example, between the start location 114 and the task location 116 (preferably, before the shift location 118). Therefore, the robotic system 100 can create or derive a control sequence for providing one or more portions of the operation object 112 to one or more scanners 412.

The sensor 216 can further include, for example, a location sensor 224 (e.g., a location encoder, a potentiometer, and the like) configured to detect a location of a structural member, a link, or a joint. This location sensor 224 can be used to track the location and/or orientation of the structural member, the link, or the joint during execution of the task.

Further, the sensor 216 can include, for example, a contact sensor 226 (e.g., a pressure sensor, a force sensor, a strain gauge, a piezoresistive/piezoelectric sensor, a capacitive sensor, an elastoresistive sensor, other tactile sensors, and the like) configured to measure a characteristic associated with a direct contact between physical structures or surfaces. The contact sensor 226 can measure the characteristic of the operation object 112 corresponding to a grip of the end effector. Accordingly, the contact sensor 226 can output a contact measure that represents a quantified and measured value (e.g., a measured force, torque, location, and the like) corresponding to a degree of contact between the end effector and the operation object 112. Here, the "contact measure" can include, for example, one or more force or torque readings associated with forces applied to the operation object 112 by the end effector.

Determination of Confidence Measure for Initial Pose

Figure 3A:
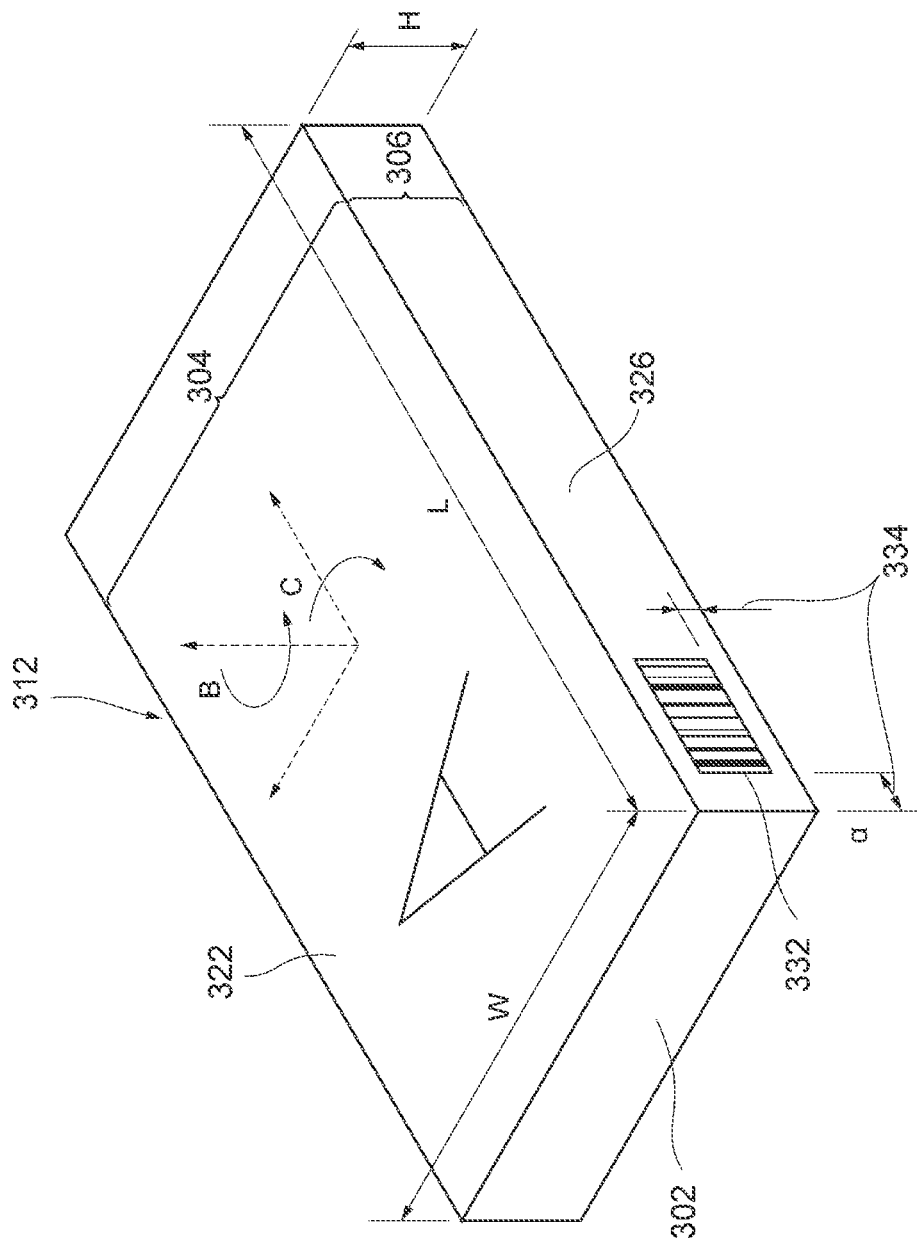
FIG. 3A is a perspective view schematically illustrating a first pose of an operation object.
Figure 3B:
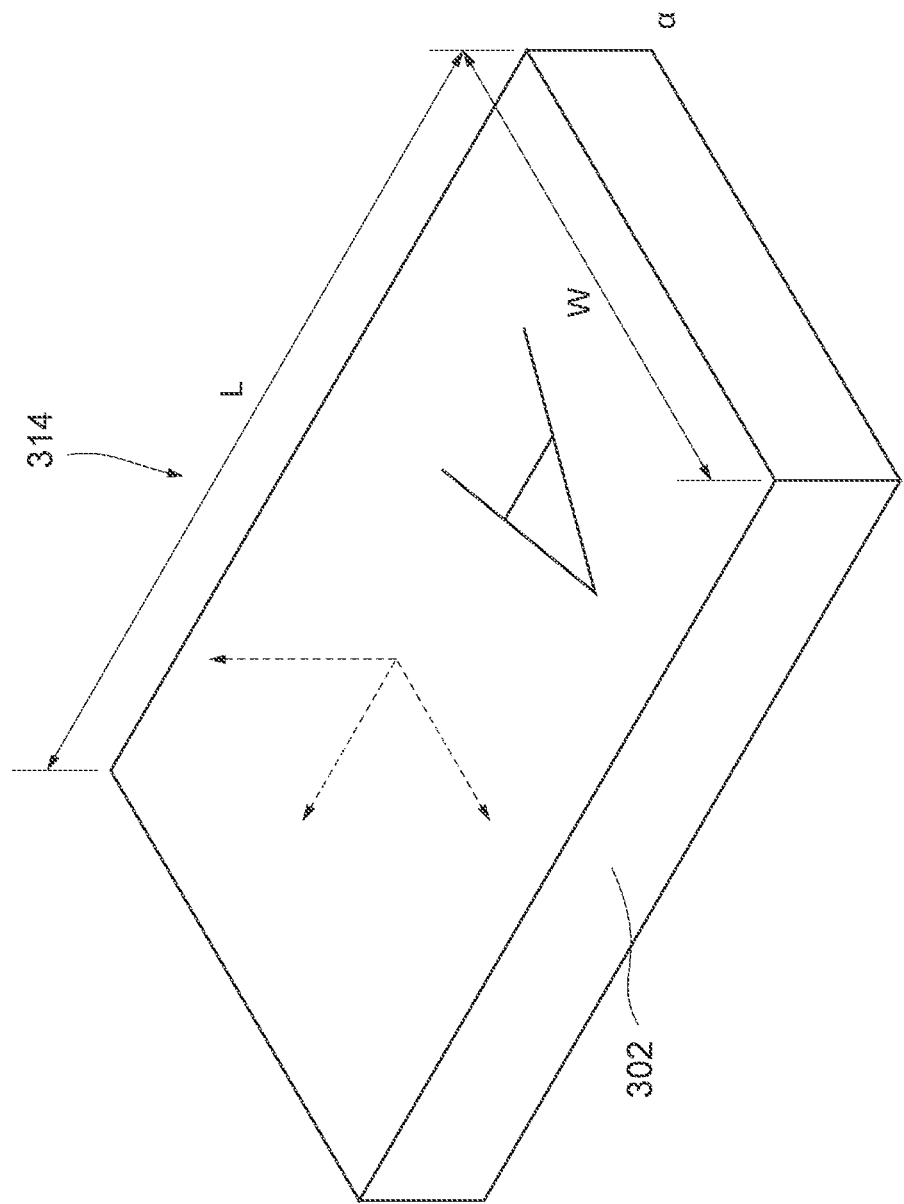
FIG. 3B is a perspective view schematically illustrating a second pose of the operation object.
Figure 3C:
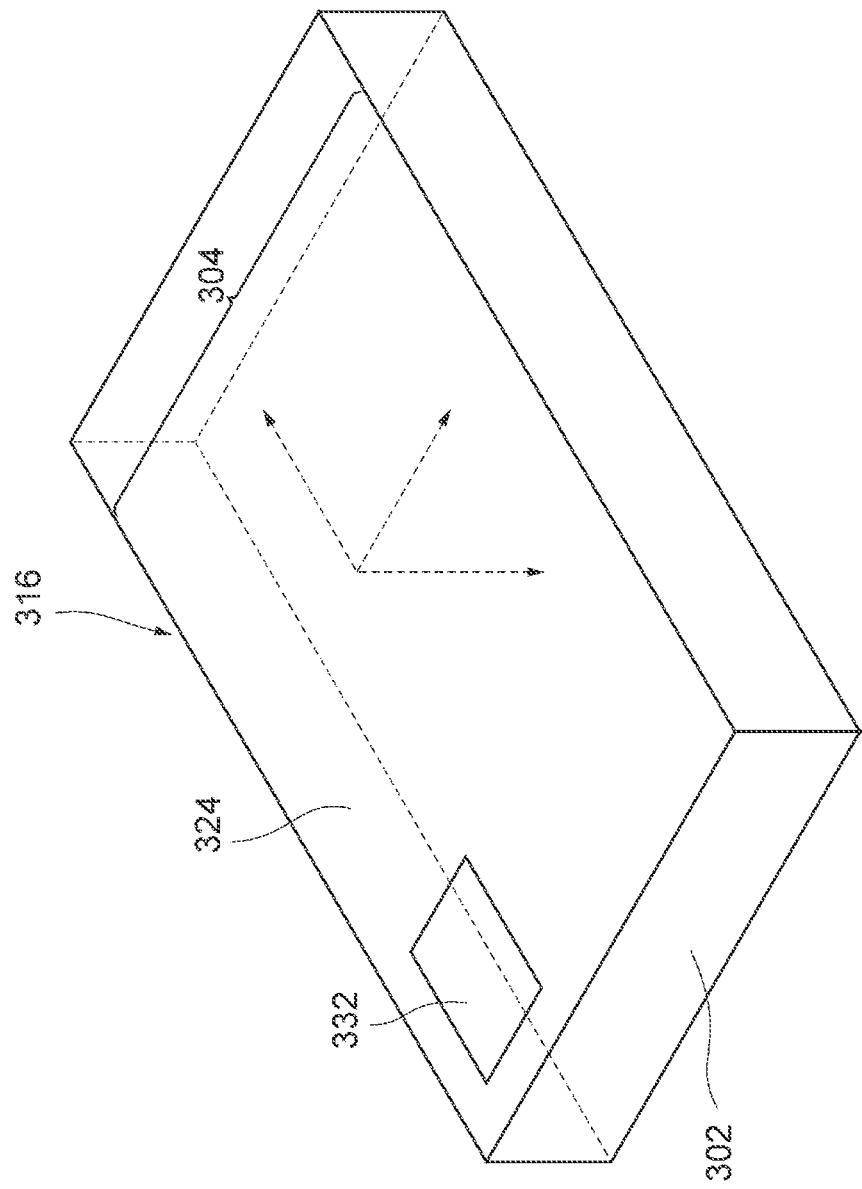
FIG. 3C is a perspective view schematically illustrating a third pose of the operation object.

FIGS. 3A, 3B, and 3C are perspective views schematically illustrating a first pose 312, a second pose 314, and a third pose 316, respectively, as an example of an operation object 302 in various poses (locations and orientations). In order to identify the pose of the operation object 302, the robotic system 100 can process, for example, a 2-dimensional image, a 3-dimensional image, a point cloud, and/or other imaging data from the imaging device 222. In addition, in order to identify an initial pose of the operation object 302, the robotic system 100 can analyze, for example, imaging data by one or more imaging devices 222 directed to the pick-up area.

In order to identify the pose of the operation object 302, the robotic system 100 can first analyze and identify the operation object 302 depicted in the imaging data based on a predetermined recognition mechanism, a recognition rule, and/or a template related to a pose or an outline. The robotic system 100 can identify an outline (e.g., a perimeter edge or surface) of the operation object 302, or group the outlines in the image data. The robotic system 100 can identify, for example, the groupings of the outlines that correspond to a set of pixels in the image data that match or correspond to values) the color, the brightness, the depth/location, and/or a combination thereof of a corresponding aspect of an object registered in the master data 252.

When the outlines of the operation object 302 are grouped, the robotic system 100 can identify, for example, one or more surfaces, edges, and/or points, and poses of the operation object 302 in a grid or coordinate system used in the robotic system 100.

In addition, the robotic system 100 can identify one or more exposed surfaces (e.g., a first exposed surface 304, a second exposed surface 306, and the like) of the operation object 302 in the imaging data. Further, the robotic system 100 can identify the operation object 302, for example, by determining an outline shape and one or more dimensions (e.g., a length, a width, and/or a height) of the operation object 302 from the imaging data according to the outline and the calibration of the operation object 302 or mapping data for the imaging device 222, and comparing the determined dimensions with corresponding data in the master data 252. Further, the robotic system 100 can identify whether an exposed surface corresponds to any of a top surface 322, a bottom surface 324, and an outer peripheral surface 326, based on a length, a width, and a height of the operation object 302 in which dimensions of the exposed surface is identified.

In addition, the robotic system 100 can identify the operation object 302, for example, by comparing one or more markings (e.g., a letter, a number, a shape, a visual image, a logo, or a combination thereof) displayed on one or more exposed surfaces with one or more predetermined images in the master data 252. In this case, the master data 252 can include, for example, one or more images of a product name, a logo, a design/image on a package surface of the operation object 302, or a combination thereof. In addition, the robotic system 100 can identify the operation object 302 by comparing a portion of the imaging data (e.g., a portion within an outline of the operation object 302) with the master data 252, and similarly, can identify a pose (particularly, an orientation) of the operation object 302 based on a unique and predetermined image pattern on a surface.

FIG. 3A illustrates a first pose 312 where the first exposed surface 304 (e.g., an upward-facing exposed surface) is the top surface 322 of the operation object 302 and the second exposed surface 306 (e.g., an exposed surface generally facing a source of the imaging data) is one of the peripheral surfaces 326 of the operation object 302.

In identifying the exposed surfaces, the robotic system 100 can process the imaging data of FIG. 3A to map measurement values of the dimensions (e.g., the number of pixels) of the first exposed surface 304 and/or the second exposed surface 306 into real-world dimensions using a predetermined calibration or mapping function. The robotic system 100 can compare the mapped dimensions with dimensions of the known/expected operation object 302 in the master data 252 and identify the operation object 302 based on the result. Further, since a pair of intersecting edges that define the first exposed surface 304 matches the length and the width of the identified operation object 302, the robotic system 100 can identify that the first exposed surface 304 is either the top surface 322 or the bottom surface 324. Similarly, because one of the edges defining the second exposed surface 306 matches the height of the identified operation object 302, the robotic system 100 can identify the second exposed surface 306 as the peripheral surface 326.

In addition, the robotic system 100 can process the imaging data of FIG. 3A to identify one or more markings unique to a surface of the operation object 302. In this case, the master data 252 can include one or more images and/or other visual characteristics (e.g., a color, a dimension, a size, and the like) of surfaces and/or unique markings of the operation object 302 as described above. As illustrated in FIG. 3A, since the operation object 302 has "A" on the top surface 322, the robotic system 100 can identify the operation object 302 as a registered object stored in the master data 252, and identify the first exposed surface 304 as the top surface 322 of the operation object 302.

In addition, the master data 252 can include an identifier 332 as identification information of the operation object 302. More specifically, the master data 252 can include an image and/or coded message of the identifier 332 of the operation object 302, a location 334 of the identifier 332 relative to a surface and/or a set of edges, one or more visual characteristics thereof, or a combination thereof. As illustrated in FIG. 3A, the robotic system 100 can identify the second exposed surface 306 as the peripheral surface 326 based on the presence of the identifier 332 and/or the location thereof matching the location 334 of the identifier 332.

FIG. 3B illustrates a second pose 314 obtained by rotating the operation object 302 by 90 degrees about a vertical axis along a direction B in FIG. 3A. For example, a reference point "a" of the operation object 302 can be in a lower left front corner in FIG. 3A and in an upper right back corner in FIG. 3B. Accordingly, in comparison with the first pose 312, the top surface 322 of the operation object 302 can be recognized as a different orientation in the imaging data and/or the peripheral surface 326 of the operation object 302 having the identifier 332 may not be visually recognized.

The robotic system 100 can identify various poses of the operation object 302 based on a specific orientation of the identifier 332 having one or more visual features. For example, it is possible to determine the first pose 312 and/or the third pose 316 in a case where a dimension matching a known length of the operation object 302 extends horizontally in the imaging data, a dimension matching a known height of the operation object 302 extends vertically in the imaging data, and/or a dimension matching a known width of the operation object 302 extends along a depth axis in the imaging data. Similarly, the robotic system 100 can determine the second pose 314 in a case where a dimension matching a width extends horizontally in the imaging data, a dimension matching a height extends vertically in the imaging data, and/or a dimension matching a length extends along a depth axis in the imaging data.

In addition, the robotic system 100 can determine that the operation object 302 is in the first pose 312 or the second pose 314 based on an orientation of a visible marking such as "A" illustrated in FIG. 3A and FIG. 3B, for example. In addition, for example, in a case where the identifier 332 of the operation object 302 is visually recognized with a marking "A" (i.e., on a different surface), the robotic system 100 can determine that the operation object 302 is in the first pose 312 based on the visible marking to be visually recognized in a combination of respective surfaces.

FIG. 3C illustrates the third pose 316 obtained by rotating the operation object 302 by 180 degrees about a horizontal axis along a direction C in FIG. 3A. For example, a reference point "a" of the operation object 302 can be in a lower left front corner in FIG. 3A and in an upper left back corner in FIG. 3C. Accordingly, in comparison with the first pose 312, the first exposed surface 304 is the bottom surface 324 of the operation object, and both the top surface 322 and the peripheral surface 326 having the identifier 332 of the operation object 302 are not visually recognized.

As described above, the robotic system 100 can identify that the operation object 302 is in either the first pose 312 or the third pose 316 based on the dimensions determined from the image data. The robotic system 100 can further identify that the operation object 302 is in the first pose 312 in a case where the marker (e.g., "A") of the top surface 322 is visible. In addition, the robotic system 100 can identify that the operation object 302 is in the third pose 316 in a case where a bottom-surface marker (e.g., an instance of the identifier 332 of the operation object) is visually recognized.

When determining the pose of the operation object 302, real-world conditions may affect an accuracy of the determination. For example, lighting conditions may reduce visibility of a surface marking due to a reflection and/or a shadow. In addition, according to an actual orientation of the operation object 302, an exposure or viewing angle of one or more surfaces may be reduced, and therefore any marking on the surface may be unidentifiable. Accordingly, the robotic system 100 can calculate a confidence measure associated with the determined pose of the operation object 302.

The robotic system 100 can further calculate the confidence measure based on a certainty interval associated with the dimension measurement within the image in the imaging data. In this case, the certainty interval can increase as a distance between the operation object 302 and an imaging source (e.g., the imaging device 222) decreases and/or in a case where a measured edge of the operation object 302 is closer to the imaging source in a direction orthogonal to a direction radiating from the imaging source and farther away from the imaging source in a direction parallel to the radiating direction. Also, the robotic system 100 can calculate, for example, the confidence measure based on a degree of match between a marker or a design in the imaging data and a known marker/design in the master data 252. Furthermore, the robotic system 100 can measure a degree of an overlap or a deviation between at least a portion of the imaging data and a predetermined marker/image.

In this case, the robotic system 100 can identify the operation object 302 and/or an orientation thereof according to a greatest overlap and/or a lowest deviation measurement for a minimum mean square error (MMSE) mechanism, and furthermore can calculate a confidence measure based on a degree of the obtained overlap/deviation. The robotic system 100 can calculate the movement path of the operation object 302 in the control sequence based on the obtained confidence measure. In other words, the robotic system 100 can transfer the operation object 302 differently according to the obtained confidence measure.

System Operation

FIG. 4A is a top view illustrating an example task 402 which is executed by the robotic system 100 in accordance with the embodiment of the present disclosure. As described above, the example task 402 can correspond to a control sequence which is executed by the robotic system 100 (e.g., executed by one of the units illustrated in FIG. 1). As illustrated in FIG. 4A, for example, the task 402 can include moving the operation object 112 from the pick-up area including the start location 114 to the placement area including the task location 116 via the shift location 118. Also, the task 402 can include scanning the operation object 112 while moving the operation object from the start location 114 to the task location 116, and shifting the operation object 112 at the shift location 118 (by changing the grip location). Accordingly, the robotic system 100 can update the tracking data 254 of the operation object 112 by adding the scanned operation object 112 to the tracking data 254, removing the operation object 112 from the tracking data 254, and/or evaluating the operation object 112, and the like.

In addition, in order to identify and/or specify the start location 114, the robotic system 100 can include a scanner 412 (an instance of the imaging device 222) such as a 3D vision device directed at a pick-up area so as to image the pick-up area (e.g., an area designated for a part procurement pallet or a large box and/or a region on a receiving side of a belt conveyor, and the like), and thereby can derive imaging data of the designated area. Therefore, the robotic system 100 can implement a computer aided image process (vision process) for the imaging data, in order to identify the various operation objects 112 located in the designated area via the processor 202, for example.

In addition, the robotic system 100 can select an operation object 112 for which the task 402 is to be executed from among the recognized operation objects 112. The robotic system 100 can select based on, for example, a predetermined selection measure, and/or a selection rule, and/or a template related to a pose or an outline. The robotic system 100 can further process the imaging data in order to determine the start location 114 and/or the initial pose for the selected operation object 112.

In order to identify and/or specify the task location 116 and the shift location 118, the robotic system 100 can include other scanners 416 (an instance of the imaging device 222) facing the following areas so as to image the placement area and other predetermined areas (e.g., an area designated for a sorted pallet or a large box and/or a region on a receiving side of a belt conveyor, and the like). Accordingly, the robotic system 100 can derive imaging data of the designated area. Therefore, the robotic system 100 can implement a computer aided image process (vision process) for the imaging data, in order to identify the task location 116 for disposing the operation object 112, the shift location 118, and/or the pose of the operation object 112 via the processor 202, for example. In addition, the robotic system 100 can identify and select the task location 116 and the shift location 118 based on a predetermined criterion or rule for stacking and/or disposing multiple operation objects 112 (based on the imaging result or not based on the imaging result).

The scanner 416 can be disposed to face in a horizontal direction so as to scan a mark that is adjacent thereto (e.g., at a height corresponding to a height of the corresponding scanner(s)) and on a vertically oriented surface of the operation object 112. Further, the scanner 416 can be disposed to face in a vertical direction so as to scan a mark that is above/below thereof and on a horizontally oriented surface of the operation object 112. Furthermore, the scanners 416 can be disposed to oppose each other so as to scan opposite sides of the operation object 112 that is placed between the scanners 416.

In addition, the robotic system 100 can operate the operation object 112 so as to place the operation object 112 at a presentation location and/or so as to scan one or more surfaces/portions of the operation object 112 with the scanners 416, according to the location and/or scanning direction of the scanner 416. Further, the robotic system 100 can include the imaging device 222 configured to measure a height location of the bottom surface 324 of the operation object 112 which has been scanned by the scanner 416 and a support location of which is known, for example (see FIG. 4B).

In order to execute the task 402 using such an identified start location 114, the shift location 118, and/or the task location 116, the robotic system 100 can operate one or more structural members (e.g., a robotic arm 414 and/or the end effector) of each unit. Accordingly, the robotic system 100 can create or derive a control sequence that corresponds to one or more actions that will be implemented by the corresponding unit to execute the task 402, via the processor 202, for example.

For example, the control sequence for the transfer unit 104 can include placing the end effector at an approach location (e.g., a location/position for gripping the operation object 112), gripping the operation object 112, lifting the operation object 112, moving the operation object 112 from above the start location 114 to the presentation location/pose for the scanning operation, shifting the operation object 112 at the shift location 118 (changing the grip location), moving the operation object 112 from the start location 114 to above the task location 116, as necessary, via a shift location 118, lowering the operation object 112, and releasing the operation object 112.

In addition, the robotic system 100 can create or derive the control sequence by determining a sequence of commands and/or settings for one or more actuation devices 212 that operate the robotic arm 414 and/or the end effector. In this case, the robotic system 100 can use, for example, the processor 202 to calculate the commands and/or settings of the actuation device 212 for manipulating the end effector and the robotic arm 414 to place the end effector at the approach location about the start location 114, grip the operation object 112 with the end effector, place the end effector at the approach location around the scan location or shift location 118, place the end effector at the approach location around the task location 116, and release the operation object 112 from the end effector. Accordingly, the robotic system 100 can execute an operation for completing the task 402 by operating the actuation device 212 according to the determined control sequence of commands and/or settings.

In addition, the robotic system 100 can create or derive a control sequence based on the confidence measure for the pose of the operation object 112. In this case, the robotic system 100 can consider placement of the end effector at various locations for pickup in order to grip or cover a different surface, calculate various presentation locations/poses for the operation object 112, or a combination thereof according to the confidence measure for the pose, for example.

As an illustrative example, in a case where the operation object 112 is the operation object 302 placed in the first pose 312 of FIG. 3A (in this case, the top surface 322 of the operation object 302 generally faces upward and is exposed) and the confidence measure for the pose is high (i.e., a degree of a certainty exceeds the sufficiency threshold and the determined pose is more likely accurate), the robotic system 100 can create or derive a first control sequence 422 that includes a first approach location 432 and a first presentation location 442. At this time, for example, since there is a sufficient certainty that the top surface 322 of the operation object 302 faces upward (i.e., the bottom surface 324 with the identifier 332 of the operation object 302 of FIG. 3C faces downward), the robotic system 100 can calculate the first control sequence 422 that includes the first approach location 432 for placing the end effector directly over the top surface 322 of the operation object 302.

As a result, the robotic system 100 can grip the operation object 112 with the end effector contacting/covering the top surface 322 of the operation object 302 such that the bottom surface 324 of the operation object 302 is exposed. In addition, the robotic system 100 can calculate the first control sequence 422 that includes the first presentation location 442 for causing the operation object 112 to be directly over an upward-facing scanner 416 for scanning the identifier 332 located on the bottom surface 324.

In contrast, in a case where the confidence measure for the pose is low (i.e., a degree of a certainty is less than a sufficiency threshold and a likelihood that the determined pose is accurate is low), the robotic system 100 can create or derive a second control sequence 424 (i.e., different from the first control sequence 422) that includes a second approach location 434 and one or more second presentation locations 444. At this time, for example, the robotic system 100 can measure the dimensions of the operation object 112, compare the dimensions with the master data 252, and determine that the operation object 302 is in either the first pose 312 of FIG. 3A or the third pose 316 of FIG. 3C (e.g., in a case where a certainty level of the measurement exceeds a predetermined threshold).

However, the robotic system 100 may have a difficulty in imaging/processing a mark printed on the surface of the operation object 112, and as a result, the confidence measure associated with the determined pose can be less than a sufficiency threshold. In other words, the robotic system 100 may not be sufficiently certain whether the upward-facing exposed surface of the operation object 302 is the top surface 322 thereof (corresponding to, e.g., the first pose 312) or the bottom surface 324 thereof (corresponding to, e.g., the third pose 316).

In this case, due to the low degree of the confidence measure (the low degree of a certainty), the robotic system 100 can calculate the second control sequence 424 that includes the second approach location 434 for placing the end effector (e.g., aligned with and/or facing in a direction parallel to the top surface 322 and/or the bottom surface 324 of the operation object 302) to be adjacent to one of the peripheral surfaces 326 of the operation object 302 of FIG. 3A.

As a result, the robotic system 100 can grip the operation object 112 with the end effector contacting/covering one of the peripheral surfaces 326 of the operation object 302 and causing both the top surface 322 and the bottom surface 324 of the operation object 302 to be exposed. In addition, the robotic system 100 can simultaneously or sequentially present or place the top surface 322 and the bottom surface 324 of the operation object 302 in front of the scanners 416 (e.g., in a scanning field and/or in a state of facing the scanning field). In a case where the operation object 112 is in the scan location, the robotic system 100 can operate the scanners 416 (e.g., at least the scanners 416 facing the top surface 322 and the bottom surface 324 of the operation object 302) to simultaneously and/or sequentially scan the presented surfaces and derive the identifier(s) 332 of the operation object 302 above the scanner.

In addition, the second control sequence 424 includes the second presentation location(s) 444 for disposing the surface that faces downward initially (the bottom surface 324 of the operation object 302) horizontally and directly over the upward-facing scanner 416 and/or for placing the surface that faces upward initially (the top surface 322 of the operation object) vertically and directly in front of a horizontally-facing scanner 416. The second control sequence 424 can include a reorienting/rotating action (e.g., an action as represented by a dotted-unfilled circle) for providing two presentation locations/poses, and thereby both the top surface 322 and the bottom surface 324 are scanned using orthogonally facing scanners 416. Further, for example, the robotic system 100 can sequentially present the top surface 322 of the operation object 302 to the upward-facing scanner and scan the top surface, and then rotate the operation object 302 by 90 degrees to present the bottom surface 324 thereof to the horizontally-facing scanner 416 for scanning. At that time, the reorienting/rotating action can be conditional such that the robotic system 100 implements the corresponding commands in a case where reading the identifier 332 of the operation object 302 fails.

Also, as an example, the robotic system 100 can create or derive a control sequence (not shown) for gripping/covering one of the peripheral surfaces 326 along a width of the operation object 302 in a case where the confidence measure is low. The robotic system 100 can move the operation object 302 between a horizontally opposing pair of the scanners 416 to present the peripheral surfaces 326 of the operation object 302 along the length thereof and scan the identifier 332 on one of the peripheral surfaces 326 for example, as illustrated in FIG. 3A, for example. Further, details regarding the control sequence based on the confidence measure will be described later with reference to FIGS. 5A and 5B described later.

In addition, the robotic system 100 can derive the control sequence based on a 2-dimensional or 3-dimensional shape of the operation object 112 gripped by the end effector (hereinafter, referred to as the "operation object 112" instead of the "operation object 302") and the information regarding the operation object 112 in a storage container 450 placed at the task location 116 (e.g., a box, a bin, and the like).

As an example, the robotic system 100 determine dimensions of the operation object 112 in both cases of the first control sequence and the second control sequence described above, for example. The robotic system 100 can determine/track placement locations, orientations, and/or dimensions of other objects (e.g., previously stored objects) in the storage container 450 placed at the task location 116. Accordingly, the robotic system 100 can obtain information regarding open/available space in the storage container 450. The robotic system 100 can calculate space shape parameters of the operation object 112 according to various poses of the operation object 112 and according to various different grip locations. Therefore, by comparing these space shape parameters with the available space in the storage container 450, the robotic system 100 can optimize and select a pattern or plan with which the operation object 112 can be stored at a higher filling density in the storage container 450.

In this case, when the end effector accesses the storage container 450, the robotic system 100 can consider the presence/absence of interference between the end effector and the storage container 450 or the operation object 112 already stored. Therefore, the robotic system 100 can determine an increase in a filling rate in the storage container 450 for a pose change or a grip location change. Accordingly, the robotic system 100 can create or derive a control sequence including an operation of shifting the operation object 112 to a pose associated with the increased/higher storage rate.

Figure 4B:
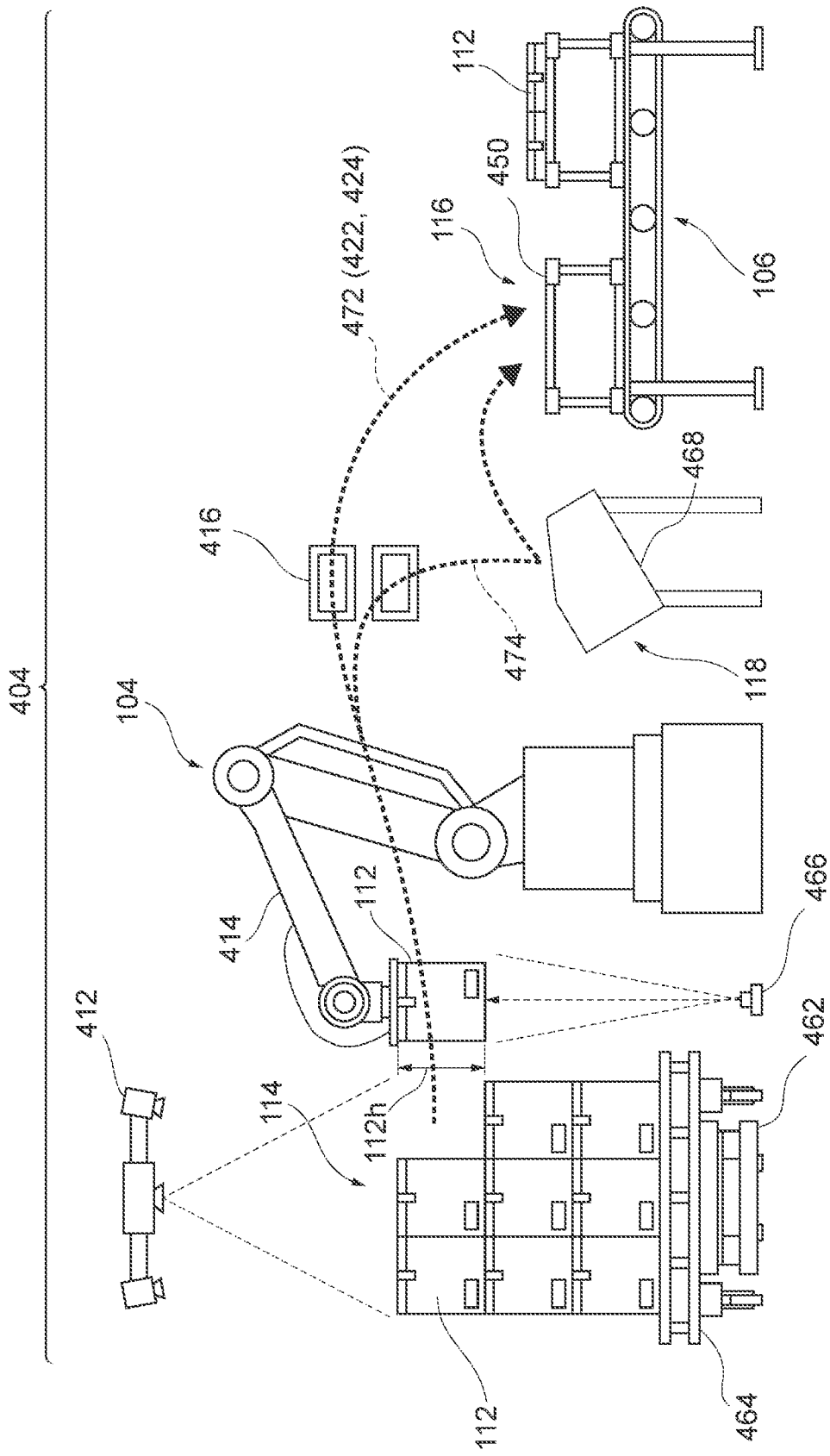
FIG. 4B is a front view illustrating an example task executed by the robotic system in accordance with the embodiment of the present disclosure.

FIG. 4B is a front view illustrating an example task 404 which is executed by the robotic system 100 in accordance with the embodiment of the present disclosure. In this example, multiple operation objects 112 are placed on a pallet 464 that is carried to the pick-up area including the start location 114 in a state of being mounted on a self-propelled carriage unit 462 such as an automated guided vehicle (AGV). For illustrative purposes, FIG. 4B shows multiple operation objects 112 having the same shape and stacked according to a pattern However, it is understood that, in many cases, multiple operation objects 112 having different dimensions may be randomly stacked on the pallet 464.

The pick-up area in which the pallet 464 is carried is imaged by the scanner 412, and the operation object 112 is selected in the same manner as described with reference to FIG. 4A. For the selected operation object 112, in this example, the top surface 322 of the operation object 112 is gripped by the end effector installed at the tip of the robotic arm 414 of the transfer unit 104, the identifier 332 is scanned with the scanner 416, and the information of the identifier 332 is derived. For example, the robotic system 100 can obtain information including the dimensions of the operation object 112 by comparing the information of the identifier 332 of the operation object 112 with the master data 252.

In some instances, objects having the same identifier 332 may actually have different dimensions (particularly height). Therefore, for example, when scanning the operation object 112, the robotic system 100 measures the distance to the bottom surface 324 of the operation object 112 by using a distance measuring device 466 (an example of the imaging device 222) installed on a floor of the task space or near the floor surface. At this time, in a case where the movement of the operation object 112 is temporarily stopped during scanning, the distance to the bottom surface 324 of the operation object 112 can be measured during the temporary stop. For illustrative purposes, FIG. 4B show that the measurement by the distance measuring device 466 is performed immediately after the operation object 112 is unloaded (depalletized) from the pallet 464. However, it is understood that a timing of the measurement is not particularly limited The distance measuring device 466 can be configured to obtain the measurements at an upstream location of (before) the shift location 118 in the control sequence.

In this example, the robotic system 100 can obtain a height location (gripping level) of the top surface 322 of the operation object 112 at the time of measurement according to a control sequence or an appropriate location measurement. Therefore, a height 112h of the operation object 112 can be derived using the height level and the measured value of the distance to the bottom surface 324 of the operation object 112. That is, the robotic system 100 receives the measurement data of the bottom surface 324 of the operation object 112 by the distance measuring device 466, and the height 112h can be calculated from the received measurement data and the height location (gripping level) of the top surface 322 of the operation object 112. In a case where the height 112h is different from a value stored as the master data 252 of the operation object 112, the robotic system 100 can replace the master data 252 or update the master data 252 by adding the different value thereto.

After actual dimensions of the operation object 112 are determined in this way, the robotic system 100 can calculate the space shape parameters of the pose when the operation object 112 is gripped in various directions. Therefore, by comparing these space shape parameters with the information on a space in the storage container 450 placed at the task location 116, the robotic system 100 can optimize and select a plan or pattern with which the operation object 112 is stored at a higher filling density in the storage container 450.

At this time, when the end effector accesses the storage container 450, the robotic system 100 calculates the presence/absence of interference between the end effector and the storage container 450 or the already-stored objects. When the interference may occur, the pattern can be eliminated. Therefore, when a new pose or grip location different than the current grip location/orientation increases a filling rate of the storage container 450, the robotic system 100 can change remaining portions of the control sequence 472 (corresponding to the first control sequence 422 or the second control sequence 424 in FIGS. 4A and 4B) and create an updated control sequence including an operation of shifting the operation object 112 so as to be a pose optimized for storage.

On the other hand, in a case where the pose of the operation object 112 gripped at a current time point is optimal from a viewpoint of a storage efficiency, the robotic system 100 stores the gripped operation object 112 in the storage container 450 without changing the control sequence 472.

In addition, in a case where the operation object 112 is to be shifted, the robotic system 100 operates the operation object 112 according to the updated control sequence 474. For example, the operation object 112 can be moved to a peripheral area of the shift location 118 after the scan. The robotic system 100 can orient the end effector according to a predetermined orientation for temporary placement, place the operation object 112 on a temporary placing table 468 accordingly, and release the grip. The temporary placing table is not particularly limited and can include, for example, a pedestal and the like which can place the operation object 112 so that at least two surfaces thereof are exposed. In some embodiments, the temporary placing table may be configured to hold the operation object 112 in a tilted state while supporting the operation object 112, thereby improving access to grip the object and increase stability during the gripping operation. The robotic system 100 can shift the operation object 112 by changing the orientation of the end effector and gripping surfaces of the operation object 112 different from the previous grip locations before temporarily placing the operation object 112.

The robotic system 100 stores the shifted operation object 112 in the storage container 450. At this time, the end effector may be rotated or adjusted with respect to a target location without directly positioning the end effector at a time. In addition, multiple end effectors or multiple units may be provided, and control may be performed so that each end effector is properly used in relation to the size of the operation object 112.

Further, in the above description, in order to execute the actions for the task 402, the robotic system 100 can track a current location (e.g., a set of coordinates corresponding to a coordinate system used by the robotic system 100) and/or a current pose of the operation object 112. For example, the robotic system 100 can track the current location/pose according to data from the location sensor 224 of FIG. 2 via the processor 202, for example. The robotic system 100 can place one or more portions of the robotic arm 414 (e.g., the link or the joint) according to data from the location sensor 224. The robotic system 100 can further calculate the location/pose of the end effector, and thereby calculate the current location of the operation object 112 held by the end effector, based on the location and orientation of the robotic arm 414. Also, the robotic system 100 can track the current location based on processing other sensor readings (e.g., force readings or accelerometer readings), the executed actuation commands/settings, and/or the associated timings, or a combination thereof according to a dead-reckoning mechanism.

Operational Flow (Control Sequence Based on Confidence Measure)

Figure 5A:
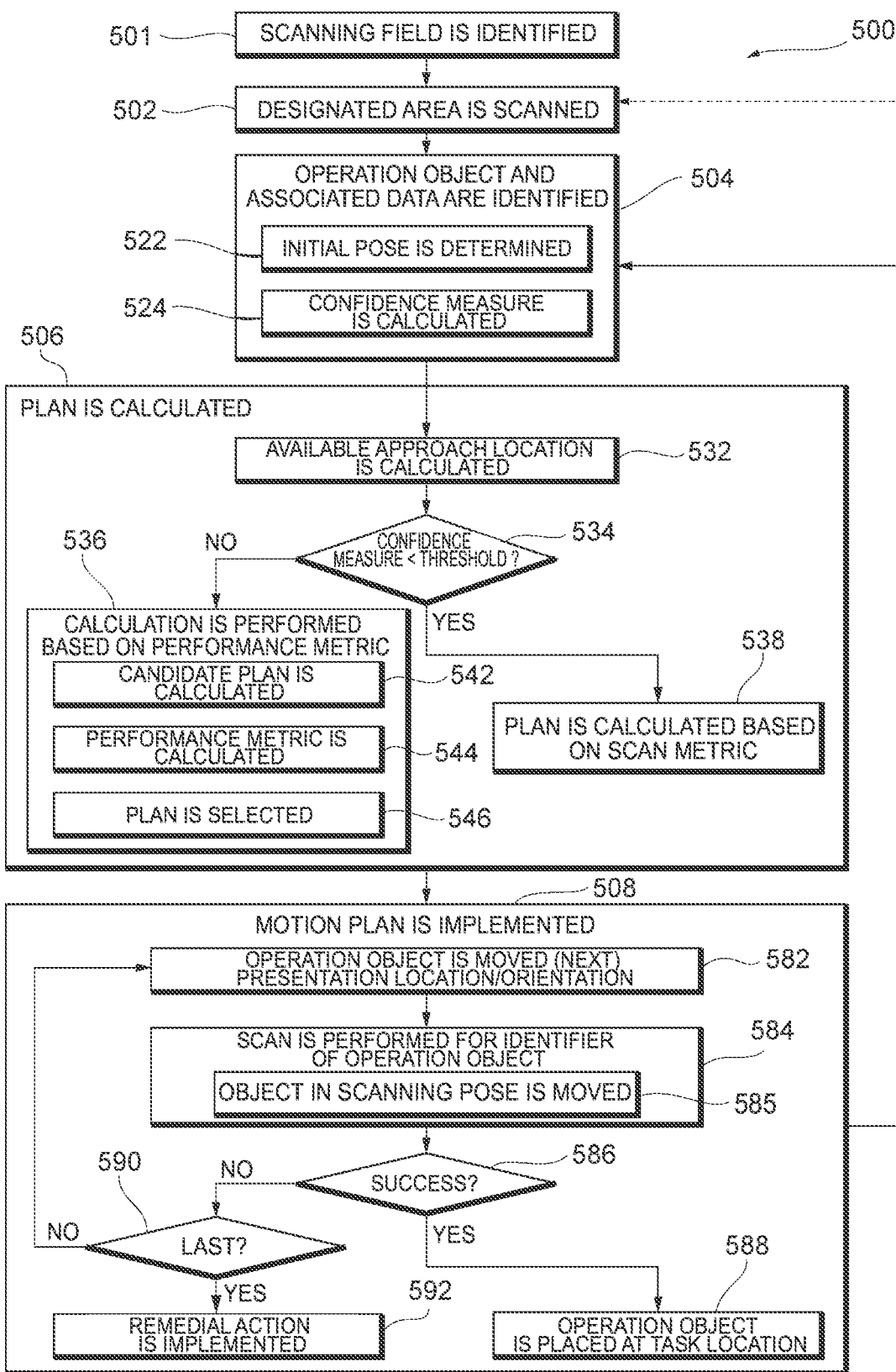
FIG. 5A is a flow diagram illustrating an example process flow of the robotic system in accordance with the embodiment of the present disclosure.

FIG. 5A is a flow diagram of a method 500 illustrating an example process flow of the robotic system 100 in accordance with the embodiment of the present disclosure. The method 500 includes a procedure of deriving/calculating and implementing a control sequence based on a confidence measure to execute the task 402 of FIG. 4A. The confidence measure can be associated with determining the initial pose of the operation object 112. In addition, the method 500 can be implemented based on executing the instructions stored on one or more storage devices 204 with one or more processors 202.

At block 501, the robotic system 100 can identify scanning fields of one or more imaging devices 222 of FIG. 2. For example, the robotic system 100 (via, e.g., one or more processors 202) can identify spaces that can be scanned by one or more imaging devices 222, such as the scanners 412 and 416 of FIGS. 4A and 4B. The robotic system 100 can identify the scanning fields that are oriented in opposite directions and/or orthogonal directions according to orientations of the scanners 416. As illustrated in FIGS. 4A and 4B, the scanners 416 can be arranged opposite to each other and/or facing each other, such as across a horizontal direction or across a vertical direction. Also, the scanners 416 can be arranged perpendicular to each other, such as one facing up or down and another facing a horizontal direction.

For example, the robotic system 100 can identify the scanning fields according to the master data 252. The master data 252 can include grid locations, coordinates, and/or other markers representing the imaging devices 222 and/or the corresponding scanning fields. The master data 252 can be predetermined according to a layout and/or a physical dislocation of the imaging devices 222, the capabilities of the imaging device 222, environmental factors (e.g., lighting conditions and/or obstacles/structures), or a combination thereof. In addition, the robotic system 100 can implement a calibration process to identify the scanning fields. For example, the robotic system 100 can use the transfer unit 104 to place a known mark or code at a set of locations and determine whether the corresponding imaging device 222 accurately scans the known mark. The robotic system 100 can identify the scanning fields based on the locations of the known mark that resulted in accurate scanning results.

At block 502, the robotic system 100 can scan designated areas. The robotic system 100 can generate (via, e.g., via a command/prompt sent by the processor 202) imaging data (e.g., the derived digital images and/or point clouds) of one or more designated areas, such as the pick-up area and/or the placement area, using one or more imaging devices 222 (e.g., the scanners 412 of FIGS. 4A and 4B and/or other area scanners). The imaging data can be communicated from the imaging devices 222 to the one or more processors 202. Accordingly, one or more processors 202 can receive the imaging data that represents the pick-up area (including, e.g., operation objects 112 before execution of the task), the shift area, and/or the placement area (including, e.g., operation objects 112 after execution of the task) for further processing.

At block 504, the robotic system 100 can identify the operation object 112, the associated locations (e.g., the start location 114 of FIG. 1 and/or the task location 116 of FIG. 1), and/or the initial poses of the operation objects 112. The robotic system 100 can analyze (via, e.g., the processor 202) the imaging data based on a pattern recognition mechanism and/or a recognition rule in order to identify outlines (e.g., perimeter edges and/or surfaces) of the operation objects 112. The robotic system 100 can further identify the groupings of outlines and/or surfaces of the operation objects 112 based on, for example, a predetermined recognition mechanism, a recognition rule, and/or templates related to poses or outlines as corresponding to the various operation objects 112.

For example, the robotic system 100 can identify the groupings of the outlines of the operation objects 112 that correspond to a pattern (having, e.g., the same values or values that vary at a known rate/pattern) in the color, the brightness, the depth/location, and/or a combination thereof over the outlines of the operation objects 112. In addition, for example, the robotic system 100 can identify the groupings of the outlines and/or surfaces of the operation objects 112 according to predetermined shape/pose templates, images, or a combination thereof defined in the master data 252.

From the operation objects 112 recognized in the pick-up area, the robotic system 100 can select one as the operation object 112 (e.g., according to a predetermined sequence or set of rules and/or templates of outlines of operation objects). For example, the robotic system 100 can select the operation object 112 according to the point cloud representing the distances/locations relative to a known location of the scanner 412. In addition, for example, the robotic system 100 can select the operation object 112 that is located at a corner/edge and has two or more surfaces that are exposed/shown in the imaging results. Further, the robotic system 100 can select the operation object 112 according to a predetermined pattern or sequence (e.g., left to right, nearest to farthest, and the like, relative to a reference location).

For the selected operation object 112, the robotic system 100 can further process the imaging data in order to determine the start location 114 and/or an initial pose. For example, the robotic system 100 can determine the start location 114 by mapping a location (e.g., a predetermined reference point for the determined pose) of the operation object 112 in the imaging data to a location in the grid used by the robotic system 100. The robotic system 100 can map the locations according to a predetermined calibration map.

The robotic system 100 can process the imaging data of the placement areas to determine available/open spaces between already-placed objects. The robotic system 100 can map the outlines of the operation object 112 according to a predetermined calibration map for mapping image locations to real-world locations and/or coordinates used by the system. Based on the mapping, the robotic system 100 can determine the open spaces. The robotic system 100 can determine the open spaces as the space between the outlines (furthermore, surfaces of the operation object 112) belonging to different groupings that each correspond to an already-placed object. The robotic system 100 can determine the open spaces suitable for the operation object 112 by measuring one or more dimensions of the open spaces and comparing the measured dimensions with one or more dimensions of the operation objects 112 (e.g., as stored in the master data 252). In addition, the robotic system 100 can select one of the suitable/open spaces as the task location 116 according to a predetermined pattern (e.g., left to right, nearest to farthest, bottom to top, and the like, relative to a reference location).

The robotic system 100 can determine the task location 116 without processing the imaging data or in addition to processing the imaging data. For example, the robotic system 100 can place a set of objects at the placement area according to a predetermined control sequence and locations without re-imaging the area after each placement. Also, for example, the robotic system 100 can process the imaging data for performing multiple tasks (e.g., moving multiple operation objects 112, such as tasks for operation objects 112 located on a common layer/column of a stack).

At block 522, for example, the robotic system 100 can determine an initial pose (e.g., an estimate of a stopped pose of the operation object 112 at the pick-up area) based on processing the imaging data (e.g., the imaging data from the scanner 412). The robotic system 100 can determine the initial pose of the operation object 112 based on comparing the outline of the operation object 112 with outlines in predetermined pose templates of the master data 252 (e.g., comparing pixel values). For example, the templates of the predetermined pose can include a different potential arrangement of the outlines of the operation objects 112 according to corresponding orientations of expected operation objects 112. The robotic system 100 can identify the sets of outlines of the operation objects 112 (e.g., edges of an exposed surface, such as the first exposed surface 304 of FIG. 3A and/or FIG. 3C and/or the second exposed surface 306 of FIG. 3A) that were previously associated with the selected operation object 112. The robotic system 100 can determine the initial pose by selecting one of the pose templates that corresponds to a lowest difference measurement between the compared outlines of the operation objects 112.

For further example, the robotic system 100 can determine the initial pose of the operation object 112 based on physical dimensions of the operation object 112. The robotic system 100 can estimate physical dimensions of the operation object 112 based on the dimensions of the exposed surfaces captured in the imaging data. The robotic system 100 can measure a length and/or an angle for each outline of the operation object 112 in the imaging data and then map or transform the measured length to a real-world length or a standard length using a calibration map, a transformation table or process, a predetermined equation, or a combination thereof. The robotic system 100 can use the measured dimensions to identify the operation object 112 and/or the exposed surface(s) corresponding to the physical dimensions.

The robotic system 100 can identify the operation object 112 and/or the exposed surface(s) by comparing the estimated physical dimensions with a set of known dimensions (e.g., a height, a length, and/or a width) of the operation objects 112 and their surfaces in the master data 252. The robotic system 100 can identify the exposed surface(s) and the corresponding pose using the matched set of dimensions. For example, the robotic system 100 can identify the exposed surface as either the top surface 322 of the operation object 302 of FIG. 3A or the bottom surface 324 of the operation object 302 of FIG. 3B (e.g., a pair of opposing surfaces) in a case where the dimensions of the exposed surface match a length and a width for an expected operation object 112. Based on the orientation of the exposed surface, the robotic system 100 can determine the initial pose of the operation object 112 (e.g., either the first pose 312 or the third pose 316 of the operation object 302 in a case where the exposed surface faces upward).

For example, the robotic system 100 can determine the initial pose of the operation object 112 based on a visual image of one or more surfaces of the operation object 112 and/or one or more markings thereof. The robotic system 100 can compare the pixel values within a set of connected outlines with predetermined marking-based pose templates of the master data 252. For example, the marking-based pose templates can include one or more unique markings of expected operation objects 112 in various different orientations. The robotic system 100 can determine the initial pose of the operation object 112 by selecting one of the surfaces, the surface orientations, and/or the corresponding poses that result in a lowest difference measurement for the compared images.

At block 524, the robotic system 100 can calculate a confidence measure associated with the initial pose of the operation object 112. The robotic system 100 can calculate the confidence measure as a part of determining the initial pose. For example, the confidence measure can correspond to a measure of a difference between the outline of the operation object 112 and the outline in the selected template described above. In addition, for example, the confidence measure can correspond to a tolerance level associated with the estimated physical dimensions and/or the angles described above. Also, for example, the confidence measure can correspond to the difference measure between a visual marking in the imaging data and the template images described above.

At block 506, the robotic system 100 can calculate a control sequence for executing the task 402 related to the operation object 112 (e.g., the first control sequence 422 of FIG. 4A, the second control sequence 424 of FIG. 4A, the control sequence 472 in FIG. 4B, and the like), and the control sequence 474 including a shift operation of the operation object 112 illustrated in FIG. 4B.

For example, the robotic system 100 can create or derive the control sequence based on calculating a sequence of commands or settings, or a combination thereof, for the actuation devices 212 to operate the robotic arm 414 of FIGS. 4A and 4B and/or the end effector. For some tasks, the robotic system 100 can calculate control sequences and setting values for manipulating the robotic arm 414 and/or the end effector and for moving the operation object 112 from the start location 114 to the task location 116, as necessary via the shift location 118. The robotic system 100 can implement a control sequence mechanism (e.g., a process, a function, an equation, an algorithm, a computer-generated/readable model, or a combination thereof) configured to calculate a movement path in space.

For example, the robotic system 100 can use A* algorithm, D* algorithm, and/or other grid-based searches so as to calculate the movement path through a space for moving the operation object 112 from the start location 114 to the task location 116 through one or more presentation poses/locations (e.g., one or more corresponding scan locations for the end effector), as necessary via the shift location 118. The control sequence mechanism can transform the movement path into the sequence of commands or settings, or a combination thereof, for the actuation devices 212 using a further process, function, or equation, and/or a mapping table. In using the control sequence mechanism, the robotic system 100 can calculate the control sequence that will manipulate the robotic arm 414 and/or the end effector and cause the operation object 112 to follow the calculated movement path.

The robotic system 100 can selectively create or derive a control sequence based on the confidence measure. The robotic system 100 can calculate the control sequence that includes an approach location (e.g., the first approach location 432 of FIG. 4A and/or the second approach location 434 of FIG. 4A), one or more scan locations (e.g., the first presentation location 442 of FIG. 4A and/or the second presentation location 444 of FIG. 4A), or a combination thereof according to the confidence measure. For example, the robotic system 100 can calculate the approach location and/or the scan location according to a metric (e.g., a performance metric and/or a scan metric) based on an outcome of comparing the confidence measure to a sufficiency threshold. The scan location can be for placing the end effector so as to present one or more surfaces of the operation object 112 before one or more corresponding scanners 416 for scanning the one or more identifiers 332 of the operation object 112 (by, e.g., placing/orienting the object in the scanning field).

At block 532, the robotic system 100 can calculate (via, e.g., the processors 202) a set of available approach locations. The available approach locations can correspond to open or non-occupied spaces about the start location 114 sufficient for placing the end effector. In addition, the robotic system 100 can place the end effector at a selected approach location for contacting and gripping the operation object 112 without disturbing other operation objects 112.

For example, the robotic system 100 can calculate the set of available approach locations by calculating separation distances between the outline of the operation object 112 and the outlines of adjacent operation objects 112. The robotic system 100 can compare the separation distances with a predetermined set of distances that correspond to a physical size/shape of the end effector and/or various orientations thereof. The robotic system can identify each of the available approach locations in a case where the corresponding separation distances exceed the predetermined set of distances corresponding to the size of the end effector.

In decision block 534, the robotic system 100 can compare the confidence measure to one or more sufficiency thresholds to determine whether or not the confidence measure is satisfied. In a case where the confidence measure satisfies the sufficiency threshold (e.g., when the confidence measure exceeds the required sufficiency threshold), as illustrated at block 536, the robotic system 100 can calculate the control sequence (e.g., the first control sequence 422) based on a performance metric. When the confidence measure satisfies the sufficiency threshold, the robotic system 100 can determine that the initial pose is suitable and calculate the control sequence without considering a scan metric that corresponds to a likelihood for scanning at least one identifier 332 of the operation object 112 and/or without considering a likelihood that the initial pose may be inaccurate.

As an example, the robotic system 100 can calculate candidate plans at block 542. Each of the candidate plans can be an instance of a control sequence that corresponds to a unique combination of an available approach location and a scan location (e.g., corresponding presentation location/orientation for the operation object 112). The robotic system 100 can calculate the location 334 of the identifier 332 according to the initial pose by rotating the location(s) 334 of the identifier 332 or a corresponding model/pose in the master data 252. The robotic system 100 can eliminate available approach locations that causes the end effector to cover the location 334 of the identifier 332 (e.g., to be placed directly over, in front of, and/or within a threshold distance from the location of the identifier).

The robotic system 100 can calculate a candidate plan for each remaining available approach location in the set (e.g., a calculation result of block 532). For each of the candidate plans, the robotic system 100 can further calculate a unique scan location according to the available approach location. The robotic system 100 can calculate the scan location based on rotating and/or moving a model of the operation object 112, and thereby the surface corresponding to the location 334 of the identifier 332 is in the scanning field and faces the corresponding scanner 416. The robotic system 100 can rotate and/or move the model according to a predetermined process, equation, function, and the like.

At block 544, the robotic system 100 can calculate a performance metric for each candidate plan. The robotic system 100 can calculate the performance metric that corresponds to a throughput (rate) for completing the task 402. For example, the performance metric can be associated with a movement distance of the operation object 112, an estimated movement duration, the number of commands and/or setting changes for the actuation devices 212, a completion rate (e.g., a rate complementary to a piece-loss amount), or a combination thereof for the candidate plan. The robotic system 100 can calculate the corresponding values for the candidate control sequence using one or more measured or known data (e.g., an acceleration/speed associated with settings/commands and/or piece-loss rate associated with a grip surface and/or a maneuver) and a predetermined calculation process, equation, function, and the like.

At block 546, the robotic system 100 can select the candidate plan with the maximum performance metric (i.e., along with the corresponding approach location) as the control sequence. For example, the robotic system 100 can select, as the control sequence, the candidate plan that corresponds to the highest completion rate, the shortest movement distance, the lowest number of commands and/or setting changes, the fastest movement duration, or a combination thereof among the set of candidate plans. Accordingly, the robotic system 100 can select the available approach location in the set that corresponds to the highest performance metric as the approach location.

In comparison, the robotic system 100 can calculate the candidate plan according to a different measure in a case where the confidence measure does not satisfy the sufficiency threshold (e.g., the confidence measure is less than the required sufficiency threshold). As illustrated at block 538, the robotic system 100 can calculate the control sequence (e.g., the second control sequence 424) based on a scan metric. The scan metric is a value (e.g., a binary value or a non-binary score/percentage) that corresponds to a likelihood that at least one of the identifiers 332 of the operation object 112 remains uncovered by the end effector and is to be scannable, regardless of whether or not the initial pose is accurate.

For example, the robotic system 100 can prioritize the scan metric (e.g., satisfy first and/or give it a heavier weight) over the performance metric in a case where the confidence measure does not satisfy the sufficiency threshold. Accordingly, the robotic system 100 can calculate the control sequence that includes one or more scan locations for providing (i.e., in the scanning field and/or facing the corresponding scanner) at least one uncovered identifier 332 of the operation object 112 in front of one or more scanners 416.

FIG. 5B is a flow diagram illustrating an example process flow of the robotic system in accordance with the embodiment of the present disclosure, and illustrates a flow diagram 538 for selectively calculating a control sequence (e.g., one or more locations for the end effector) based on a scan metric.

In this example, calculating the control sequence based on a scan metric can include calculating a set of locations of the exposed identifiers 332 as illustrated in block 552. The robotic system 100 can calculate the set of locations of the exposed identifiers 332 (e.g., the locations 334 of the identifier 332 that remain uncovered or scannable with the end effector in the grip location) relative to the initial pose of the operation object 112. The robotic system 100 can calculate the location 334 of the exposed identifier 332 for each of the available approach locations. The locations 334 of the exposed identifiers 332 can correspond to locations 334 of the identifiers 332 of the operation object 112 that remain uncovered with the end effector at the corresponding approach location according to a hypothesis that the initial pose is accurate.

As described above for block 542, the master data 252 can include a computer model or a template (e.g., offset measurements relative to one or more edges and/or images of the operation object 112) in which the location 334 of the identifier 332 for each of the expected operation objects 112 is described. The robotic system 100 can calculate the set of locations of the exposed identifiers 332 based on rotating and/or moving the predetermined model/template in the master data 252 to match the initial pose. The robotic system 100 can eliminate the approach locations that cause the end effector to cover the location 334 of the identifier 332 (e.g., with the end effector placed directly over, in front of, and/or within a threshold distance from the location of the identifier). In other words, the robotic system 100 can eliminate the available approach locations that are directly over, in front of, and/or within a threshold distance from the locations 334 of the identifiers 332.

At block 554, the robotic system 100 can calculate a set of locations 334 of alternative identifiers 332. The robotic system 100 can calculate the set of locations 334 of the alternative identifiers 332 for poses alternative to the initial pose. For each of the available approach locations, the robotic system 100 can calculate alternative poses, and for each of the alternative poses, the robotic system 100 can calculate locations of the alternative identifiers 332. Accordingly, the locations of the alternative identifiers 332 can correspond to the locations 334 of the identifiers 332 of the operation objects 112 that remain uncovered with the end effector at the corresponding approach location according to a hypothesis that the initial pose is not accurate. As described above for the locations 334 of the exposed identifiers 332, the robotic system 100 can calculate the locations 334 of the alternative identifiers 332 based on rotating and/or moving the predetermined model/template in the master data 252 according to the alternative pose.

At block 556, the robotic system 100 can calculate an exposure likelihood for each of the approach locations, each of the alternative poses, each of the identifiers 332 of the operation object 112, or a combination thereof. The exposure likelihood represents a likelihood that one or more identifiers of the operation object 112 remain exposed and scannable with the end effector gripping the operation object 112 from the corresponding approach location. The exposure likelihood can represent both the scenario that the initial pose is accurate and the scenario that the initial pose is not accurate. In other words, the exposure likelihood can represent the likelihood that one or more identifiers of the operation object 112 remain exposed and scannable even if the initial pose is inaccurate.

For example, the robotic system 100 can calculate the exposure likelihood as a conditional certainty, such as a probabilistic value corresponding to a particular condition (e.g., a unique instance of the approach location, the alternative pose, the identifier of the operation object 112, or a combination thereof). The robotic system 100 can calculate the exposure likelihood based on combining (via, e.g., adding and/or multiplying) the conditional certainty with a certainty/likelihood that the particular condition is true (e.g., a value close to the confidence measure). The robotic system 100 can calculate the exposure likelihood based on adding the certainty for each of the identifiers considered to be exposed when multiple identifiers are exposed for the considered approach location and/or the considered pose.

The robotic system 100 can calculate the exposure likelihood based on combining the certainty values based on locations of the exposed identifiers and locations of the alternative identifiers, for each of potential poses for a considered approach location. For example, the robotic system 100 can calculate the exposure likelihood using the certainties for locations of the exposed identifiers and locations of the alternative identifiers with opposing signs (e.g., positive and negative). The robotic system 100 can calculate the exposure likelihood based on adding the magnitudes of the two certainties and/or adding the certainties with the signs. The overall magnitude can represent an overall likelihood that one or more identifiers 332 of the operation object 112 remain to be scannable, and the signed/vectored likelihood can represent a likelihood that one or more identifiers of the operation object 112 remain to be scannable even if the initial pose was inaccurate. Accordingly, an approach location would be ideal when the overall magnitude is higher, and the signed/vectored likelihood is closer to zero, such as representing similar chances that the identifier 332 of the operation object 112 would be scannable regardless of the accuracy for the initial pose.

At block 558, the robotic system 100 can select an approach location. The robotic system 100 can select, as the approach location, the available approach location that includes the location 334 of the uncovered identifier 332 in both a set of the exposed identifiers 332 (e.g., a set of estimated locations of the identifiers 332 of the operation object 112 according to a hypothesis that the initial pose is accurate) and a set of the alternative identifiers 332 (e.g., one or more sets of estimated locations of the identifiers 332 of the operation object 112 according to a hypothesis that the initial pose is not accurate). In other words, the robotic system 100 can select the approach location that would leave at least one identifier 332 exposed and scannable regardless of the accuracy of the initial pose. The robotic system 100 can select, as the approach location, the available approach location that corresponds to the exposure likelihood matching and/or closest to a target condition, such as the largest overall magnitude and/or the signed/vectored likelihood that is closer to zero.

The robotic system 100 can calculate a scan likelihood (e.g., a likelihood that an exposed identifier 332 of the operation object 112 is successfully scanned) based on the exposure likelihood. For example, the robotic system 100 can combine the exposure likelihood with an evaluation value (e.g., a tracked rate of successful scans, a physical size, and/or a type of the identifier 332) associated with the corresponding exposed identifier 332 of the operation object 112. The robotic system 100 can select, as the approach location, the available approach location that corresponds to the highest scan likelihood.

The robotic system 100 can compare the set of the exposed identifier 332 to the set of the alternative identifier 332 to determine whether the set of the exposed identifier 332 and the set of the alternative identifier 332 include locations on opposing surfaces of the operation object 112 (e.g., between the first pose 312 and the third pose 316). Accordingly, the robotic system 100 can select an available approach location that corresponds to a third surface (e.g., one of the peripheral surfaces 326 of the operation object 302) that is orthogonal to the two opposing surfaces.

At block 560, in a case where the confidence measure does not satisfy the sufficiency threshold, the robotic system 100 can create or derive candidate control sequences based on the selected approach location. The robotic system 100 can calculate the candidate control sequences that include one or more scan locations for the end effector that correspond to one or more presentation locations/orientations for placing the identifiers 332 of the operation object 112 in both the set of the exposed identifier 332 and the set of the alternative identifier 332. In other words, the robotic system 100 can calculate the candidate control sequences that can scan the operation object 112 regardless of the accuracy of the initial pose.

The robotic system 100 can create or derive the candidate control sequences that account for the locations 334 of the identifiers 332 in both the set of the exposed identifier 332 and the set of the alternative identifiers 332. For example, the robotic system 100 can calculate the candidate control sequences that account for the locations of the identifiers 332 having a likelihood, on opposing and/or orthogonal surfaces. Accordingly, the robotic system 100 can account for an opposing pose (e.g., a pose oriented in an opposite direction where the outline of the operation object 112 is placed so as to be the same from a visual recognition location/angle) and/or other rotated poses in addition to the initial pose. Referring back to FIG. 3A and FIG. 3C as an illustrative example, the robotic system 100 can calculate the candidate control sequences that account for both the first pose 312 and the third pose 316 in a case where the grip location corresponds to one of the peripheral surfaces 326 of the operation object 302.

In order to account for multiple possible poses (e.g., erroneous estimation of the initial pose), the robotic system 100 can calculate a scanning pose for placing the identifiers 332 of the operation object 112 in both the set of the exposed identifiers 332 and the set of the alternative identifiers 332. As illustrated at block 562, the robotic system 100 can calculate a set of candidate poses for the operation object 112 in the scanning fields or through the scanning fields. When the approach location is selected, the robotic system 100 can calculate candidate scan locations as described above for block 542, such as by rotating and/or moving a model of the location 334 of the identifier 332 so as to place the location 334 of the identifier 332 in the scanning field.

At block 564, the robotic system 100 can map the set of the exposed identifier 332 and the set of the alternative identifier 332 to each of the candidate scan locations. The robotic system 100 can map the set of the exposed identifier 332 based on rotating the model of the location 334 of the identifier 332 starting from the initial pose. The robotic system 100 can map the set of the alternative identifier 332 based on rotating the model of the location 334 of the identifier 332 starting from one of the alternative poses (e.g., the opposing pose).

When the locations 334 of the identifiers 332 are mapped, at block 568, the robotic system 100 can compare the locations 334 and/or orientations of the identifiers 332 of the operation object 112 in both the set of the exposed identifier 332 and the set of the alternative identifier 332 with the scanning fields. At decision block 570, the robotic system 100 can determine whether in the candidate pose, the identifiers 332 of the operation object 112 in both the set of the exposed identifier 332 and the set of the alternative identifier 332 simultaneously are presented to the scanners.

At block 572, the robotic system 100 can identify, as the scanning pose, the candidate poses that simultaneously present the identifiers 332 of the operation object 112 in both the set of the exposed identifiers 332 and the set of the alternative identifiers 332 to different scanners/scanning fields. For example, in a case where the grip location corresponds to one of the peripheral surfaces 326 of the operation object 112 with the locations of the operation object 112 in the set of the exposed identifier 332 and the set of the alternative identifier 332 of the operation object 112 being on opposing surfaces, the robotic system 100 can identify the scanning pose for placing the operation object 112 between a pair of opposing/facing scanners with each of the opposing surfaces of the operation object 112 facing one of the scanners.

At block 574, in a case where none of the candidate poses simultaneously presents the identifiers 332 of the operation object 112 in both the set of the exposed identifier 332 and the set of the alternative identifier 332 of the operation object 112, the robotic system 100 can calculate multiple scan locations (e.g., a first scan location and a second scan location) that each present at least one identifier 332 of the operation object 112 from the set of the exposed identifier 332 and the set of the alternative identifier 332 of the operation object 112. For example, the first scan location can present the locations 334 of one or more identifiers 332 in the set of the identifiers 332 of the exposed operation object 112 to one of the scanners, and the second scan location can present the locations 334 of one or more identifiers 332 in the set of the identifiers 332 of the alternative operation object 112 to one of the scanners. The second scan location can be associated with rotating the end effector about an axis, translating the end effector, or a combination thereof from the first scan location.

Referring back to the example illustrated in FIGS. 4A and 4B, the second control sequence 424 can correspond to the second approach location 434 that corresponds to the third surface (e.g., one of the peripheral surfaces 326 of the operation object 112) that is orthogonal to the two opposing surfaces (e.g., for the first pose 312 and the third pose 316) as described above. Accordingly, the first scan location can correspond to one first location of the second presentation locations 444 that places a surface (e.g., estimated to be the bottom surface 324 of the operation object 112) corresponding to the initial pose (e.g., the first pose 312) above an upward-facing scanner 416 and facing the scanner. The second scan location can correspond to one second location of the second presentation locations 444 that rotates the operation object 112 by 90 degrees in a counter-clockwise direction relative to an overall movement direction (e.g., generally from the start location 114 to the task location 116). Accordingly, the second scan location can correspond to the second presentation location 444 that places a surface (e.g., determined to be the bottom surface 324 of the operation object 112) corresponding to the alternative pose (e.g., the third pose 316) in front of a horizontally facing scanner 416 and in a vertical orientation facing this scanner 416.

According to the resulting scanning pose and/or the set of scan locations, the robotic system 100 can create or derive the candidate control sequence. The robotic system 100 can calculate the candidate plans to place the end effector at the selected approach location, thereby to contact and grip the operation object 112, and lift and move the operation object 112 to the identified scanning pose and/or the set of scan locations, using one or more mechanisms described above (e.g., the A* mechanism). For example, when the scanning pose is identified, the robotic system 100 can calculate the candidate plans to establish the scanning pose for the operation object 112 in the scanning fields or through the scanning fields. In a case where the robotic system 100 does not identify the scanning pose, the robotic system 100 can calculate the candidate plans to move/orient the end effector sequentially through the set of multiple scan locations, thereby sequentially moving/rotating the operation object 112 according to multiple presentation locations/orientations.

At block 576, the robotic system 100 can create again or update the scanning likelihood for each of the candidate control sequences. The robotic system 100 can update the scanning likelihood based on combining the various likelihoods and/or preferences as described above for block 544 (e.g., probabilities and/or scores for the approach location, the scan location, the utilized scanner 416, the identifier 332 considered to be exposed, an associated error and/or a loss rate, or a combination thereof), but with respect to the scan metric instead of the performance metric.

At block 578, the robotic system 100 can create or derive the control sequence based on selecting the candidate plan according to the scanning likelihood. The robotic system 100 can select, as the control sequence, the candidate plan that has maximum scanning likelihood among the candidate plans. For example, the robotic system 100 can select the candidate plan that has the highest likelihood of placing at least one of the locations 334 of the exposed identifiers 332 and at least one of the locations 334 of the alternative identifiers 332 in one or more scanning fields (e.g., in front of one or more scanners 416) during the movement of the operation object 112 for scanning in the space between the start location 114 and the task location 116, for example.

In a case where two or more candidate plans correspond to scanning likelihoods within a relatively small difference value (e.g., a predetermined threshold), the robotic system 100 can calculate and evaluate the performance metric corresponding to the corresponding candidate plan (e.g., as described above for blocks 544 and 546). The robotic system 100 can select, as the control sequence, the candidate plan that is closest to the target condition.

The robotic system 100 can deviate from the illustrated example flow. For example, the robotic system 100 can select the approach location as described above. Based on the selected approach location, the robotic system 100 can grip the operation object 112 and implement a predetermined set of maneuvers, such as to lift, reorient, horizontally move, place back down and release, or a combination thereof. During or after the predetermined set of maneuvers, the robotic system 100 can re-image or scan the pick-up area (via, e.g., looping back to block 502) and redetermine the initial pose and the confidence measure (via, e.g., block 522 and block 524).

Returning back to FIG. 5A, at block 508, the robotic system 100 can begin implementing the resulting control sequence. The robotic system 100 can implement the control sequence based on operating the one or more processors 202 to send the commands and/or settings of the control sequence to other devices (e.g., the corresponding actuation devices 212 and/or other processors) to execute the tasks 402 and 404. Accordingly, the robotic system 100 can execute the control sequence by operating the actuation devices 212 according to the sequence of commands or settings or combination thereof. For example, the robotic system 100 can operate the actuation devices 212 to dispose the end effector at the approach location around the start location 114, contact and grip the operation object 112, or perform a combination thereof.

At block 582, the robotic system 100 can move the end effector to the scan location, thereby moving the operation object 112 to the presentation location/orientation. For example, after or along with lifting the operation object 112 from the start location 114, the robotic system 100 can move the end effector to establish the scanning pose for the operation object 112. In addition, the robotic system 100 can move the end effector to the first scan location.

At block 584, the robotic system 100 can operate the scanners 416 to scan the operation object 112. For example, one or more processors 202 can send a command to the scanners 416 to implement a scan and/or send a query to the scanners 416 to receive a scan status and/or a scanned value. At block 585 and the like, in a case where the control sequence includes the scanning pose, the robotic system 100 can implement the control sequence to move the operation object 112 in the scanning pose across the scanning fields in a direction orthogonal to orientations of the scanning fields. While the operation object 112 is moved, the scanners 416 can (simultaneously and/or sequentially) scan multiple surfaces for multiple possible locations 334 of the identifier 332 of the operation object 112.

In decision block 586, the robotic system 100 can evaluate the scan result (e.g., status and/or the scanned value) to determine whether the operation object 112 is scanned. For example, the robotic system 100 can verify the scan result after implementing the control sequence up to the first scan location. At block 588 and the like, in a case where the scan result indicates a successful scan of the operation object 112 (e.g., the status corresponds to detection of a valid code/identifier and/or the scanned value matches the identified/expected operation object 112), the robotic system 100 can move the operation object 112 to the task location 116. Based on the successful scan, the robotic system 100 can ignore any subsequent scan location (e.g., the second scan location) and directly move the operation object 112 to the task location 116.

In a case where the scan result indicates an unsuccessful scan of the operation object 112, the robotic system 100 can determine at decision block 590 whether the current scan location is the last one in the control sequence. In a case where it is not the last control sequence, the robotic system 100 can move the operation object 112 to the next presentation location/orientation as represented by a loop back to block 582.

In a case where the current scan location is the last one in the control sequence, the robotic system 100 can implement one or more remedial actions as illustrated at block 592. The robotic system 100 can stop and/or cancel the control sequence in a case where the scan results for all of the scan locations in the control sequence indicate failed scans. The robotic system 100 can generate an error status/message for notifying an operator. The robotic system 100 can place the operation object 112 inside of an area (i.e., at a location different from the start location 114 and the task location 116) designated for the operation object 112 that failed to be scanned.

Based on either successfully completing the tasks 402 and 404 (i.e., successfully scanning the operation object 112 and placing the operation object at the task location 116) or implementing the remedial actions, the robotic system 100 can move on to the next task/operation object 112. The robotic system 100 can scan again the designated area as illustrated by a loop back to block 502 and select the next operation object 112 using the existing imaging data as illustrated by a loop back to block 504.

Scanning the operation object 112 in the air (e.g., at a location between the start location 114 and the task location 116) provides improved efficiency and speed for performing the tasks 402 and 404. By calculating the control sequence for cooperating with the scanner 416 as the control sequence that includes the scan locations, the robotic system 100 can effectively combine the task for moving the operation object 112 with the task for scanning the operation object 112. Moreover, creating or deriving a control sequence according to the confidence measure of the initial pose further improves efficiency, speed, and accuracy for the scan task. As described above, the robotic system 100 can create or derive the control sequence for accounting for alternative orientations that correspond to the scenario of the initial pose being inaccurate. Accordingly, the robotic system 100 can increase the likelihood of accurately/successfully scanning the operation object 112 even with pose determination errors, such as due to calibration errors, unexpected poses, unexpected lighting conditions, and the like The increased likelihood in accurate scans can lead to increased overall throughput for the robotic system 100 and further reduce operator efforts/interventions.

Concise Description of Various Embodiments

Embodiment 1 relates to a method for controlling a robotic system. The method comprises: deriving an approach location, the approach location representing a location of an end effector for gripping an operation object having an identification information; deriving a scan location, the scan location representing a location of a scanner for scanning the identification information of the operation object; and deriving, based on the approach location and the scan location, a control sequence for instructing a robot to execute the control sequence. The control sequence includes: gripping the operation object at a start location; scanning the identification information of the operation object with the scanner; temporarily releasing the operation object from the end effector at a shift location and regripping the operation object by the end effector to be shifted at the shift location, when a predetermined condition is satisfied, wherein the predetermined condition is associated with a storage efficiency; and moving the operation object from the shift location to a task location when the predetermined condition is satisfied. The task location is different from the start location and the shift location.

Embodiment 2 includes the method of embodiment 1. In this embodiment, the method further comprises: calculating a first storage efficiency at the task location, wherein the first storage efficiency represents a storage efficiency before the operation object is shifted at the shift location; calculating a second storage efficiency at the task location, wherein the second storage efficiency represents a storage efficiency after the operation object is shifted at the shift location; determining that the second storage efficiency is more efficient the first storage efficiency; and determining, based on the second storage efficiency, that the predetermined condition is satisfied.

Embodiment 3 includes the method of embodiment 2. In this embodiment, the method further comprises deriving a height of the operation object, wherein calculating the first storage efficiency includes calculating the first storage efficiency based on the height of the operation object, and wherein calculating the second storage efficiency includes calculating the second storage efficiency based on the height of the operation object.

Embodiment 4 includes the method of embodiment 3. In this embodiment, the method further comprises measuring a height location of a bottom surface of the operation object while the operation object is gripped, wherein deriving the height of the operation object includes calculating the height of the operation object from a height location of a top surface of the operation object and the measured height location of the bottom surface of the operation object.

Embodiment 5 includes the method of embodiment 4. In this embodiment, measuring the height location of the bottom surface of the operation object includes measuring the height location of the bottom surface of the operation object while the identification information of the operation object is scanned.

Embodiment 6 includes the method of any one of embodiments 1-5. In this embodiment, deriving the control sequence for instructing the robot to execute the control sequence includes temporarily releasing the operation object from the end effector by placing the operation object on a temporary placing table disposed at the shift location.

Embodiment 7 includes the method of any one of embodiments 1-6. In this embodiment, the method further comprises: deriving imaging data representing a pick-up area including the operation object; determining an initial pose of the operation object based on the imaging data; calculating a confidence measure indicating a likelihood that the initial pose of the operation object is accurate; and deriving the approach location and the scan location based on the confidence measure.

Embodiment 8 relates to a robotic system. The robotic system comprises: at least one processor, and at least one memory device connected to the at least one processor. The at least one memory device includes instructions thereon that, when executed by the at least one processor, cause the at least one processor for:

deriving an approach location, the approach location defining a location for an end effector to grip an operation object having an identification information;

deriving a scan location, the scan location defining a location for a scanner to scan the identification information of the operation object; and deriving, based on the approach location and the scan location, a control sequence to instruct a robot to execute the control sequence. The control sequence includes: gripping the operation object at a start location; scanning the identification information of the operation object with the scanner; temporarily releasing the operation object from the end effector at a shift location and regripping the operation object by the end effector to be shifted at the shift location, when a predetermined condition is satisfied, wherein the predetermined condition is associated with a storage efficiency; and moving the operation object from the shift location to a task location when the predetermined condition is satisfied. The task location is different from the start location and the shift location.

Embodiment 9 includes the robotic system of embodiment 8. In this embodiment, the at least one memory device further includes instructions that cause the at least one processor for:

calculating a first storage efficiency at the task location, the first storage efficiency associated with a storage efficiency before the operation object is shifted at the shift location;

calculating a second storage efficiency at the task location, the second storage efficiency associated with a storage efficiency after the operation object is shifted at the shift location;

determining that the second storage efficiency is more efficient than the first storage efficiency; and determining, based on the second storage efficiency, that the predetermined condition is satisfied.

Embodiment 10 includes the robotic system of embodiment 9. In this embodiment, the at least one memory device further includes instructions that cause the at least one processor for deriving a height of the operation object, wherein calculating the first storage efficiency includes calculating the first storage efficiency based on the height of the operation object, and wherein calculating the second storage efficiency includes calculating the second storage efficiency based on the height of the operation object.

Embodiment 11 includes the robotic system of embodiment 10. In this embodiment, the at least one memory device further includes instructions that cause the at least one processor for measuring a height location of a bottom surface of the operation object while the operation object is gripped by the end effector, wherein deriving the height of the operation object includes calculating the height of the operation object from a height location of a top surface of the operation object and the measured height location of the bottom surface of the operation object.

Embodiment 12 includes the robotic system of embodiment 11. In this embodiment, measuring the height location of the bottom surface of the operation object includes measuring the height location of the bottom surface of the operation object while the identification information of the operation object is scanned with the scanner.

Embodiment 13 includes the robotic system of any one of embodiments 8-12. In this embodiment, deriving the control sequence for instructing the robot to execute the control sequence includes temporarily releasing the operation object from the end effector by placing the operation object on a temporary placing table disposed at the shift location.

Embodiment 14 relates to a tangible, non-transitory computer-readable medium having processor instructions stored thereon. When executed by at least one processor thereof, the processor instructions cause the robotic system. The processor instructions comprise:

deriving an approach location, the approach location representing a location for an end effector for gripping an operation object having an identification information;

deriving a scan location, the scan location representing a location of a scanner for scanning the identification information of the operation object; and deriving, based on the approach location and the scan location, a control sequence for instructing a robot to execute the control sequence. The control sequence includes: gripping the operation object at a start location; scanning the identification information of the operation object with the scanner; temporarily releasing the operation object from the end effector at a shift location and regripping the operation object by the end effector to be shifted at the shift location, when a predetermined condition is satisfied, wherein the predetermined condition is associated with a storage efficiency; and moving the operation object from the shift location to a task location when the predetermined condition is satisfied. The task location is different from the start location and the shift location.

Embodiment 15 includes the tangible, non-transitory computer-readable medium of embodiment 14. In this embodiment, the processor instructions further comprise:

calculating a first storage efficiency at the task location, the first storage efficiency representing a storage efficiency before the operation object is shifted at the shift location;

calculating a second storage efficiency at the task location, the second storage efficiency representing a storage efficiency after the operation object is shifted at the shift location;

determining that the second storage efficiency is more efficient than the first storage efficiency; and determining, based on the second storage determination, that the predetermined condition is satisfied.

Embodiment 16 includes the tangible, non-transitory computer-readable medium of embodiment 15. In this embodiment, calculating the first storage efficiency includes calculating the first storage efficiency based on the height of the operation object, and calculating the second storage efficiency includes calculating the second storage efficiency based on the height of the operation object.

Embodiment 17 includes the tangible, non-transitory computer-readable medium of embodiment 16. In this embodiment, the processor instructions further comprise measuring a height location of a bottom surface of the operation object while the operation object is gripped by the end effector, wherein deriving the height of the operation object includes calculating the height of the operation object from a height location of a top surface of the operation object and the measured height location of the bottom surface of the operation object.

Embodiment 18 includes the tangible, non-transitory computer-readable medium of embodiment 17. In this embodiment, measuring the height location of the bottom surface of the operation object includes measuring the height location of the bottom surface of the operation object while the identification information of the operation object is scanned.

Embodiment 19 includes the tangible, non-transitory computer-readable medium of any one of embodiments 14-18. In this embodiment, deriving the control sequence for instructing the robot to execute the control sequence includes temporarily releasing the operation object from the end effector by placing the operation object on a temporary placing table disposed at the shift location.

CONCLUSION

The above Detailed Description of examples of the present disclosure is not intended to be exhaustive or to limit the present disclosure to the precise form disclosed above. While specific examples for the present disclosure are described above for illustrative purposes, various equivalent modifications are possible within the scope of the present disclosure, as those skilled in the relevant art will recognize. For example, while processes or blocks are provided in a given order, alternative implementations may implement routines having steps, or employ systems having blocks, in a different order, and some processes or blocks may be deleted, moved, added, subdivided, combined, and/or modified to provide an alternative or subsidiary combination. Each of these processes or blocks may be implemented in a variety of different ways. Also, while processes or blocks are at times shown as being implemented in series, these processes or blocks may instead be implemented or executed in parallel, or may be implemented at different times. Further, any specific numbers noted herein are only examples; alternative implementations may employ different values or ranges.

These and other changes can be made to the present disclosure in light of the above Detailed Description. While the Detailed Description describes certain examples of the present disclosure as well as the best mode contemplated, the present disclosure can be practiced in many ways, no matter how detailed the above description appears in text. Details of the system may change considerably in its specific implementation, while still being encompassed by the present disclosure. As noted above, particular terminology used when describing certain features or aspects of the present disclosure should not be taken to imply that the terminology is redefined herein to be restricted to any of specific characteristics, features, or aspects of the present disclosure with which the terminology is associated. Accordingly, the invention is not limited, except as by the appended claims. In general, the terms used in the following claims should not be construed to limit the present disclosure to the specific examples disclosed in the specification, unless the above Detailed Description section explicitly defines such terms.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

What is claimed is:

1. A control method of a robotic system that includes a robot having a robotic arm and an end effector, the method comprising:
    deriving an approach location at which the end effector grips an operation object at a first grip location thereon; and
    based on the approach location, creating or deriving a control sequence to instruct the robot to execute the control sequence, wherein the control sequence includes:
    detecting that a predetermined condition is satisfied;
    in response to the determination that the predetermined condition is satisfied, (1) temporarily releasing the operation object from the end effector at a shift location and (2) regripping the operation object with the end effector at a second grip location on the operation object; and
    moving the operation object to the task location.

2. The control method of claim 1, wherein the predetermined condition is based on a storage efficiency of the operation object at the task location.

3. The control method of claim 2, wherein the storage efficiency is based on a vertical dimension of the operation object.

4. The control method of claim 3, further comprising calculating the vertical dimension of the operation object from a height of a top surface of the operation object and a height of a bottom surface of the operation object measured while the operation object is gripped by the end effector.

5. The control method of claim 1, further comprising:
    obtaining imaging data representative of a pick-up area including the operation object;
    determining an initial pose of the operation object based on the imaging data;
    calculating a confidence measure in relation to an accuracy of the initial pose of the operation object; and
    deriving the approach location based on the confidence measure.

6. The control method of claim 5, wherein the control sequence further includes selectively calculating the approach location according to a performance metric and/or a scan metric, based on a result of comparing the confidence measure to a sufficiency threshold.

7. The control method of claim 6, wherein for a situation where the confidence measure does not satisfy the sufficiency threshold, the approach location are derived based on the scan metric or are derived based on the scan metric with prioritizing the scan metric over the performance metric.

8. The control method of claim 6, wherein for a situation where the confidence measure satisfies the sufficiency threshold, the approach location are derived based on the performance metric.

9. The control method of claim 1, wherein the control sequence further includes:
    deriving a first scan location for providing identification information of the operation object to a scanner;
    deriving a second scan location for providing alternative identification information of the operation object to the scanner; and
    moving the operation object (1) to the task location and ignoring the second scan location in a situation where a scan result indicates a successful scan after the operation object is moved to the first scan location, or (2) to the second scan location when a scan result indicates a failed scan after the operation object is moved to the first scan location.

10. A non-transitory computer-readable medium storing processor instructions for controlling a robotic system that includes a robot having a robotic arm and an end effector, the processor instructions causing, when executed by one or more processors, the robotic system to:
    derive an approach location at which the end effector grips an operation object at a first grip location; and
    create or derive a control sequence to instruct the robot to execute the control sequence based on the approach, wherein the control sequence includes:
    detecting that a predetermined condition is satisfied;
    in response to the determination that the predetermined condition is satisfied, (1) temporarily releasing the operation object from the end effector at a shift location and (2) regripping the operation object with the end effector at a second grip location on the operation object; and
    moving the operation object to the task location.

11. The non-transitory computer-readable medium of claim 10, wherein the predetermined condition is based on a storage efficiency of the operation object at the task location.

12. The non-transitory computer-readable medium of claim 11, wherein the storage efficiency is based on a height of the operation object.

13. The non-transitory computer-readable medium of claim 11, wherein the robotic system is further caused to calculate a vertical dimension of the operation object from a height of a top surface of the operation object and a height of a bottom surface of the operation object while the operation is gripped by the end effector.

14. The non-transitory computer-readable medium of claim 13, wherein the control sequence further includes:
    deriving a first scan location for providing identification information of the operation object to a scanner;
    deriving a second scan location for providing alternative identification information of the operation object to the scanner; and
    generating commands and/or settings to move the operation object (1) to the task location and ignoring the second scan location in a situation where a scan result indicates a successful scan after the operation object is moved to the first scan location, or (2) to the second scan location when a scan result indicates a failed scan after the operation object is moved to the first scan location.

15. A controller of a robotic system that includes a robot having a robotic arm and an end effector, the controller comprising:

a communication device configured to communicate with a remote device; and a processor coupled to the communication device, wherein the processor is configured to execute a control method, the control method comprising:

deriving an approach location at which the end effector grips an operation object at a first grip location thereon; and based on the approach location, creating or deriving a control sequence to instruct the robot to execute the control sequence, wherein the control sequence includes:

detecting that a predetermined condition is satisfied;

in response to the determination that the predetermined condition is satisfied, (1) temporarily releasing the operation object from the end effector and (2) regripping the operation object with the end effector at a second grip location on the operation object; and moving the operation object to the task location.

16. The controller of claim 15, wherein the predetermined condition is based on a storage efficiency of the operation object at the task location.

17. The controller of claim 16, wherein the storage efficiency is based on a height of the operation object.

18. The controller of claim 15, wherein the control method further includes:

obtaining imaging data representative of a pick-up area including the operation object;

determining an initial pose of the operation object based on the imaging data;

calculating a confidence measure in relation to an accuracy of the initial pose of the operation object; and deriving the approach location based on the confidence measure.

19. The controller of claim 15, wherein the control sequence further includes:

deriving a first scan location for providing identification information of the operation object to a scanner;

deriving a second scan location for providing alternative identification information of the operation object to the scanner; and generating commands and/or settings to move the operation object to the task location while bypassing the second scan location when a scan result indicates a successful scan after the operation object is moved to the first scan location.

20. The controller of claim 15, wherein the control sequence further includes:

deriving a first scan location for providing identification information of the operation object to a scanner;

deriving a second scan location for providing alternative identification information of the operation object to the scanner; and generating commands and/or settings to move the operation object (1) to the task location and ignoring the second scan location in a situation where a scan result indicates a successful scan after the operation object is moved to the first scan location, or (2) to the second scan location when a scan result indicates a failed scan after the operation object is moved to the first scan location.

* * * * *